(12) United States Patent
Hong et al.

(10) Patent No.: US 10,362,615 B2
(45) Date of Patent: Jul. 23, 2019

(54) METHOD AND APPARATUS FOR CONFIGURING DUAL CONNECTION IN MOBILE COMMUNICATION NETWORK

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/032,651

(22) PCT Filed: Oct. 27, 2014

(86) PCT No.: PCT/KR2014/010094
§ 371 (c)(1),
(2) Date: Apr. 28, 2016

(87) PCT Pub. No.: WO2015/064972
PCT Pub. Date: May 7, 2015

(65) Prior Publication Data
US 2016/0316508 A1 Oct. 27, 2016

(30) Foreign Application Priority Data

Oct. 30, 2013 (KR) .................. 10-2013-0130408
Dec. 23, 2013 (KR) .................. 10-2013-0161875

(51) Int. Cl.
*H04W 76/15* (2018.01)
*H04W 28/08* (2009.01)
(Continued)

(52) U.S. Cl.
CPC ........... *H04W 76/15* (2018.02); *H04W 28/08* (2013.01); *H04W 16/32* (2013.01);
(Continued)

(58) Field of Classification Search
CPC ..................................................... H04W 76/15
See application file for complete search history.

(56) References Cited

U.S. PATENT DOCUMENTS

| 2011/0164572 A1 | 7/2011 | Kim et al. |
| 2012/0063297 A1 | 3/2012 | Hong |

(Continued)

FOREIGN PATENT DOCUMENTS

| CN | 102055700 A | 5/2011 |
| CN | 102769849 A | 11/2012 |

(Continued)

OTHER PUBLICATIONS

Alcatel-Lucent et al., "Discussion on the control plane protocol supporting dual connectivity", R2-132769, 3GPP TSG RAN WG2 Meeting #83, Barcelona, Spain, Aug. 19-23, 2013, pp. 1-4.

(Continued)

*Primary Examiner* — Jason E Mattis
(74) *Attorney, Agent, or Firm* — IP Legal Services, LLC

(57) ABSTRACT

Provided is a method for configuring dual connection with multiple base stations by a terminal. The method includes receiving, from a first base station, a first signal including indication information that indicates configuration of the additional wireless resource through the second base station; attempting the configuration of the additional wireless resource through the second base station and random access to the second base station on the basis of the first signal; and transmitting, to the first base station, a second signal including failure indication information that indicates failure of the configuration of the additional wireless resource when failing to configure the additional wireless resource through the second base station or the random access with the second base station.

12 Claims, 21 Drawing Sheets

(51) Int. Cl.
*H04W 16/32* (2009.01)
*H04W 84/04* (2009.01)
*H04W 36/00* (2009.01)

(52) U.S. Cl.
CPC .... *H04W 36/0069* (2018.08); *H04W 36/0079* (2018.08); *H04W 84/045* (2013.01)

(56) References Cited

U.S. PATENT DOCUMENTS

| | | | |
|---|---|---|---|
| 2012/0213089 A1 | 8/2012 | Shi et al. | |
| 2012/0263128 A1 | 10/2012 | Hu et al. | |
| 2014/0335872 A1* | 11/2014 | Yamada | H04W 24/04 455/450 |
| 2015/0173120 A1* | 6/2015 | Yamada | H04W 36/0072 370/331 |
| 2015/0181479 A1* | 6/2015 | Lin | H04W 76/19 370/331 |
| 2016/0277987 A1* | 9/2016 | Chen | H04L 5/0085 |
| 2016/0285716 A1* | 9/2016 | Pelletier | H04L 5/0098 |
| 2017/0164419 A1* | 6/2017 | Kim | H04W 76/028 |
| 2018/0070259 A1* | 3/2018 | Lee | H04L 1/187 |

FOREIGN PATENT DOCUMENTS

| | | |
|---|---|---|
| KR | 10-2009-0098422 A | 9/2009 |
| KR | 10-2010-0034677 A | 4/2010 |
| KR | 10-2012-0026676 A | 3/2012 |
| KR | 10-2012-0085833 A | 8/2012 |

OTHER PUBLICATIONS

Intel Corporation, "Radio link failure handling for dual connectivity", R2-133498, 3GPP TSG RAN WG2 Meeting #83bis, Ljubljana, Slovenia, Oct. 7-11, 2013, pp. 1-4.

Catt et al., "RLM considerations for dual connectivity", R2-133363, 3GPP TSG RAN WG2 Meeting #83bis, Ljubljana, Slovenia, Oct. 7-11, 2013, pp. 1-3.

Intel Corporation, "Radio link failure handling for dual connectivity", R2-131990, 3GPP TSG RAN WG2 Meeting #82, Fukuoka, Japan, May 20-25, 2013, pp. 1-4.

State Intellectual Property Office of People's Republic of China, Office Action of corresponding CN Patent Application No. 201480058780.3, dated Jul. 9, 2018.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 30, 2012, pp. 1-325.

China National Intellectual Property Administration, Office Action of corresponding CN Patent Application No. 201480058780.3, dated Mar. 11, 2019.

* cited by examiner

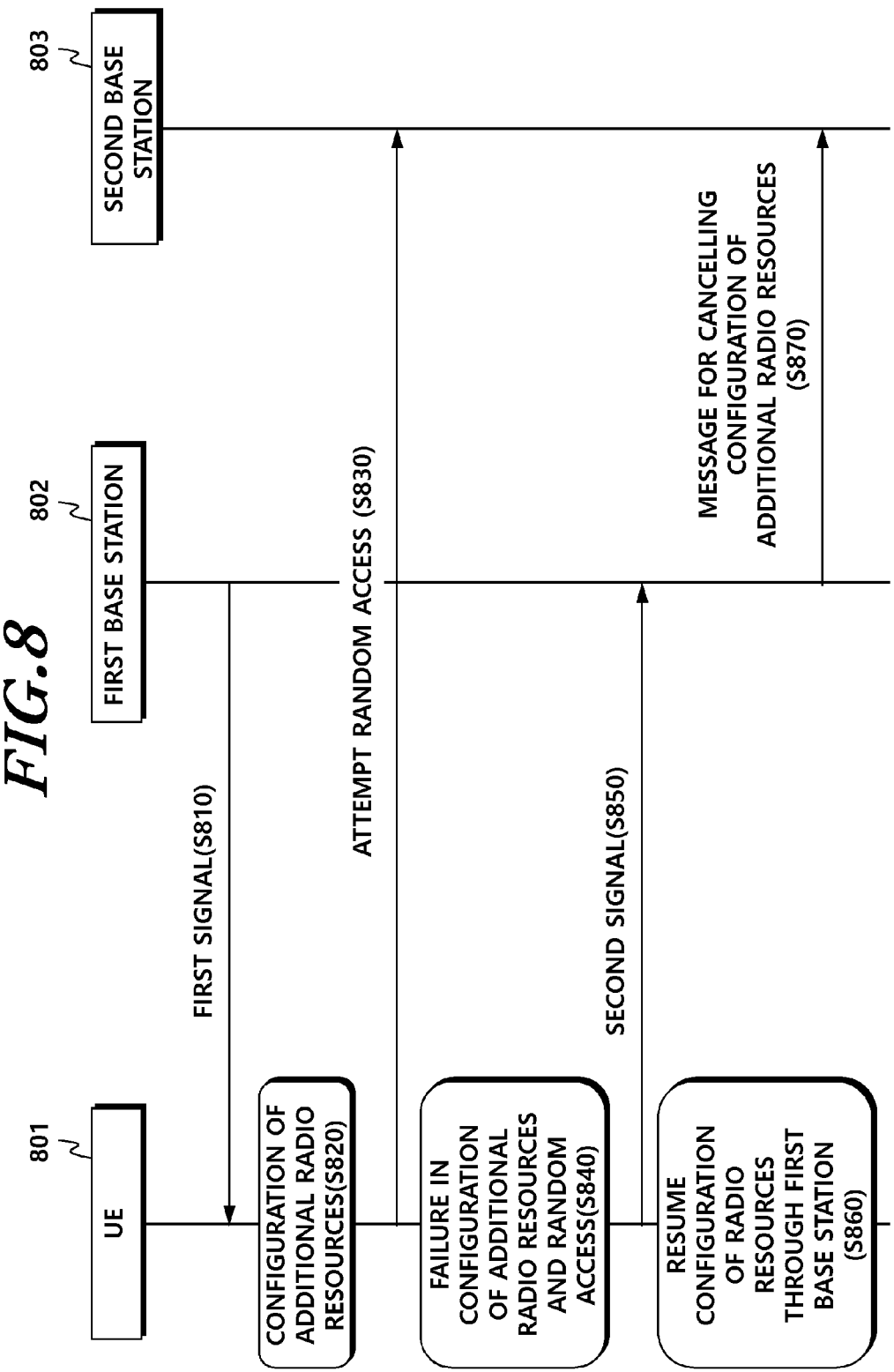

FIG.9

MobilityControlInfo information element

```
-- ASN1START
MobilityControlInfo ::=    SEQUENCE {
    targetPhysCellId         PhysCellId,
    carrierFreq              CarrierFreqEUTRA              OPTIONAL,
    carrierBandwidth         CarrierBandwidthEUTRA         OPTIONAL,
    additionalSpectrumEmission  AdditionalSpectrumEmission  OPTIONAL,
    t304                     ENUMERATED {
                                 ms50, ms100, ms150, ms200, ms500, ms1000,
                                 ms2000, spare1},
    newUE-Identity           C-RNTI,
    radioResourceConfigCommon  RadioResourceConfigCommon,
    rach-ConfigDedicated     RACH-ConfigDedicated          OPTIONAL,  -- Need OP
    SeNBradioresourceconfig  ENUMERATED  {true}            OPIONAL,
    ...,
```

(A)

MobilityControlInfo information element

```
-- ASN1START

MobilityControlInfoSCG/SeNB ::=   SEQUENCE {
    t304/ARRCtimer                   ENUMERATED {
                                     ms50, ms100, ms150, ms200, ms500, ms1000,
                                     ms2000, spare1},
    newUE-IdentitySCG/SeNB       C-RNTI            OPTIONAL,
    rach-ConfigDedicated         RACH-ConfigDedicated    OPTIONAL  -- need OP
}
```

SCellToAddMod information element

```
SCellToAddModList-r12 ::=     SEQUENCE (SIZE (1..maxSCell-r10)) OF SCellToAddMod-r12

SCellToAddMod-r12 ::=     SEQUENCE {
    sCellIndex-r12              SCellIndex-r12,
    cellIdentification-r10      SEQUENCE {
        physCellId-r10              PhysCellId,
        dl-CarrierFreq-r10          ARFCN-ValueEUTRA
    }
    radioResourceConfigCommonSCell-r10      RadioResourceConfigCommonSCell-r10      OPTIONAL,
    radioResourceConfigDedicatedSCell-r10   RadioResourceConfigDedicatedSCell-r10   OPTIONAL
    SeNBradioresourceconfig     ENUMERATED  {true}                                  OPIONAL,
    ARRCtimer                   ENUMERATED {
                                    ms50, ms100, ms150, ms200, ms500, ms1000,
                                    ms2000, spare1}                                 OPTIONAL,
    ...
}
```

FIG.11

SeNBRadioResourceConfig information element #1

```
-- ASN1START

SeNBRadioResourceConfig ::=    SEQUENCE {
    targetPhysCellId               PhysCellId,
    carrierFreq                    CarrierFreqEUTRA             OPTIONAL,
    carrierBandwidth               CarrierBandwidthEUTRA        OPTIONAL,
    additionalSpectrumEmission     AdditionalSpectrumEmission   OPTIONAL,
    t304                           ENUMERATED {
                                     ms50, ms100, ms150, ms200, ms500, ms1000,
                                     ms2000, spare1},
    radioResourceConfigCommon      RadioResourceConfigCommon,
    rach-ConfigDedicated           RACH-ConfigDedicated         OPTIONAL,
    ...,
```

FIG.12

SeNBRadioResourceConfig information element #2

```
SeNBRadioResourceConfigList-r12 ::=    SEQUENCE (SIZE ()) OF SeNBRadioResourceConfig-r12

SeNBRadioResourceConfig-r12 ::=    SEQUENCE {
    SeNBIndex-r12                  SeNBIndex-r12,
    cellIdentification-r10         SEQUENCE {
        physCellId-r10                 PhysCellId,
        dl-CarrierFreq-r10             ARFCN-ValueEUTRA
    }
    radioResourceConfigCommon      RadioResourceConfigCommon        OPTIONAL,
    rach-ConfigDedicated           RACH-ConfigDedicated             OPTIONAL,
    ARRCtimer                      ENUMERATED {
                                       ms50, ms100, ms150, ms200, ms500, ms1000,
                                       ms2000, spare1},
    ...
}
```

FIG.13

SeNBRadioResourceConfig information element #3

```
SeNBRadioResourceConfigList-r12 ::=    SEQUENCE (SIZE ()) OF SeNBRadioResourceConfig-r12

SeNBRadioResourceConfig-r12 ::=        SEQUENCE {
    SeNBIndex-r12,                         SeNBIndex-r12,
    cellIdentification-r10                 SEQUENCE {
        physCellId-r10                         PhysCellId,
        dl-CarrierFreq-r10                     ARFCN-ValueEUTRA
    }
    radioResourceConfigCommonSCell-r10     RadioResourceConfigCommonSCell-r10    OPTIONAL,
    rach-ConfigDedicated                   RACH-ConfigDedicated                  OPTIONAL,
    ARRCtimer                              ENUMERATED {
                                               ms50, ms100, ms150, ms200, ms500, ms1000,
                                               ms2000, spare1},
    ...
}
```

FIG.14

RadioResourceConfigDedicated information element

```
-- ASN1START

RadioResourceConfigDedicated ::=    SEQUENCE {
    drb-ToAddModList                    DRB-ToAddModList    OPTIONAL,
}

DRB-ToAddModList ::=    SEQUENCE (SIZE (1..maxDRB)) OF DRB-ToAddMod

DRB-ToAddMod ::=    SEQUENCE {
    eps-BearerIdentity          INTEGER (0..15)         OPTIONAL,   -- Cond DRB-Setup
    drb-Identity                DRB-Identity,
    pdcp-Config                 PDCP-Config             OPTIONAL,   -- Cond PDCP
    rlc-Config                  RLC-Config              OPTIONAL,   -- Cond Setup
    logicalChannelIdentity      INTEGER (3..10)         OPTIONAL,   -- Cond DRB-Setup
    logicalChannelConfig        LogicalChannelConfig    OPTIONAL,   -- Cond Setup
    SeNBIndex-r12
...
}
```

FIG.15

INFORMATION ON FAILURE IN CONFIGURATION OF ADDITIONAL RADIO RESOURCES

```
RLF-Report ::=          SEQUENCE {
[[  locationInfo-r10            LocationInfo-r10                OPTIONAL,
    failedSeNBId-r12            CHOICE {
        cellGlobalId-r10            CellGlobalIdEUTRA,
        pci-arfcn-r10               SEQUENCE {
            physCellId-r10              PhysCellId,
            carrierFreq-r10             ARFCN-ValueEUTRA
        }
    }
    timeFailure-r12             INTEGER ()                      OPTIONAL,
    connectionFailureType-r12   ENUMERATED {}                   OPTIONAL,
    previousPCellId-r12         CellGlobalIdEUTRA               OPTIONAL
]]
```

METHOD AND APPARATUS FOR CONFIGURING DUAL CONNECTION IN MOBILE COMMUNICATION NETWORK

CROSS REFERENCE TO RELATED APPLICATIONS

This application is a National Stage Patent Application of PCT International Patent Application No. PCT/KR2014/010094 (filed on Oct. 27, 2014) under 35 U.S.C. § 371, which claims priority to Korean Patent Application Nos. 10-2013-0130408 (filed on Oct. 30, 2013) and 10-2013-0161875 (filed on Dec. 23, 2013), the teachings of which are incorporated herein in their entireties by reference.

TECHNICAL FIELD

The present disclosure relates to a process of a user equipment (UE) for configuring dual connection with multiple base stations and, more specifically, to a method and a device for performing operations when a UE fails to configure additional radio resources in order to use radio resources provided by different base stations.

BACKGROUND ART

Due to the advance in a communication system, a wide variety of wireless devices have been introduced to consumers such as businesses and individuals.

A current mobile communication system has been affiliated with third generation partnership project (3GPP), for example, Long Term Evolution (LTE), LTE-Advanced, the like. Such a mobile communication system is a high-speed large-capacity communication system capable of transmitting and receiving various data such as video and wireless data beyond a voice-oriented service.

The high-speed large-capacity communication system requires a technology for improving the capacity of a UE by using a small cell. That is, it is required to develop a technique for providing radio resources to one UE from two or more base stations so as to process the high-speed large-capacity data.

On the other hand, in order to configure additional radio resources by the UE while performing communication through one base station, it requires a procedure for adding radio resources of other base stations and starting communication.

In addition, when a problem occurs in the procedure for adding radio resources of other base stations and starting communication using the added radio resources, it also requires a method for handling such a problem and a specific procedure for fast communication recovery by the UE.

DETAILED DESCRIPTION OF THE INVENTION

Technical Problem

According to the above-mentioned requirements, in order for a UE which communicates with a first base station to additionally use radio resources of a second base station, a procedure may be required for configuring additional radio resources.

In addition, even though the UE is still able to perform the communication through the first base station, a disconnection operation may be unnecessarily and problematically initiated if the UE fails to configure the additional radio resources through the second base station or to randomly access the second base station.

Technical Solution

The present disclosure has been made in order to solve the above-mentioned problems in the prior art and an aspect of the present disclosure is to provide a method for configuring dual connection with multiple base stations by a UE. The method includes: receiving, from a first base station, a first signal including indication information that indicates configuration of additional radio resources through a second base station; starting a timer included in the first signal; attempting random access to the second base station; and when the timer expires, transmitting, to the first base station, a second signal including failure indication information that indicates failure of the configuration of additional radio resources.

Further, in accordance with another aspect of the present disclosure, a method may be provided for controlling dual connection configuration of a UE by a first base station. The method includes: receiving, from a second base station, a first signal including indication information that indicates configuration of additional radio resources through a second base station; transmitting the first signal to a UE through high layer signaling; and receiving, from the UE, a second signal including failure indication information that indicates failure of the configuration of additional radio resources.

Furthermore, in accordance with another aspect of the present disclosure, a UE may be provided for configuring dual connection with multiple base stations. The UE includes: a reception unit configured to receive, from a first base station, a first signal including indication information indicating configuration of additional radio resources through a second base station; a controller configured to start a timer included in the first signal and attempt a random access with the second base station, and a transmission unit configured to transmit, when the timer expires, to the first base station, a second signal including failure indication information indicating failure of the configuration of additional radio resources.

Furthermore, in accordance with still another aspect of the present disclosure, a first base station may be provided for controlling dual connection of a UE. The first base station includes: a reception unit configured to receive, from a second base station, a first signal including indication information that indicates configuration of additional radio resources through a second base station; and a transmission unit configured to transmit the first signal to a UE through high layer signaling, wherein the reception unit further receives a second signal including failure indication information indicating failure of the configuration of additional radio resources.

Advantageous Effects

According to embodiments of the present disclosure, a specific procedure of a UE may be provided for performing configuring additional radio resources through a second base station.

Further, according to embodiments of the present disclosure, the UE may be able to perform communication by using a radio resource through an existing first base station when the UE fails to configure the additional radio resource through the second base station.

Furthermore, in accordance with embodiments of the present disclosure, it may significantly reduce the unnecessary process of releasing the existing radio resources and attempting to acquire a new connection even when the configuration of additional radio resources through the second base station has failed.

BRIEF DESCRIPTION OF THE DRAWINGS

FIG. 8 is a diagram showing an exemplary operation of a UE and a base station when failing to configure an additional radio resource, according to an embodiment of the present disclosure;

FIG. 9 is a diagram showing exemplary information indicating the configuration of additional radio resources that can be included in a first signal according to an embodiment of the present disclosure;

FIG. 10 is a diagram showing another exemplary information indicating the configuration of additional radio resources that can be included in a first signal according to another embodiment of the present disclosure;

FIG. 11 is a diagram showing still another exemplary information indicating the configuration of additional radio resources that can be included in a first signal according to still another embodiment of the present disclosure;

FIG. 12 is a diagram showing still another exemplary information indicating the configuration of additional radio resources that can be included in a first signal according to still another embodiment of the present disclosure;

FIG. 13 is a diagram showing still another exemplary information indicating the configuration of additional radio resources that can be included in a first signal according to still another embodiment of the present disclosure;

FIG. 14 is a diagram showing still another exemplary information indicating the configuration of additional radio resources that can be included in a first signal according to still another embodiment of the present disclosure;

FIG. 15 is a diagram showing exemplary information on a failure of the configuration of additional radio resources according to still another embodiment of the present disclosure;

MODE FOR CARRYING OUT THE INVENTION

Figure 1:
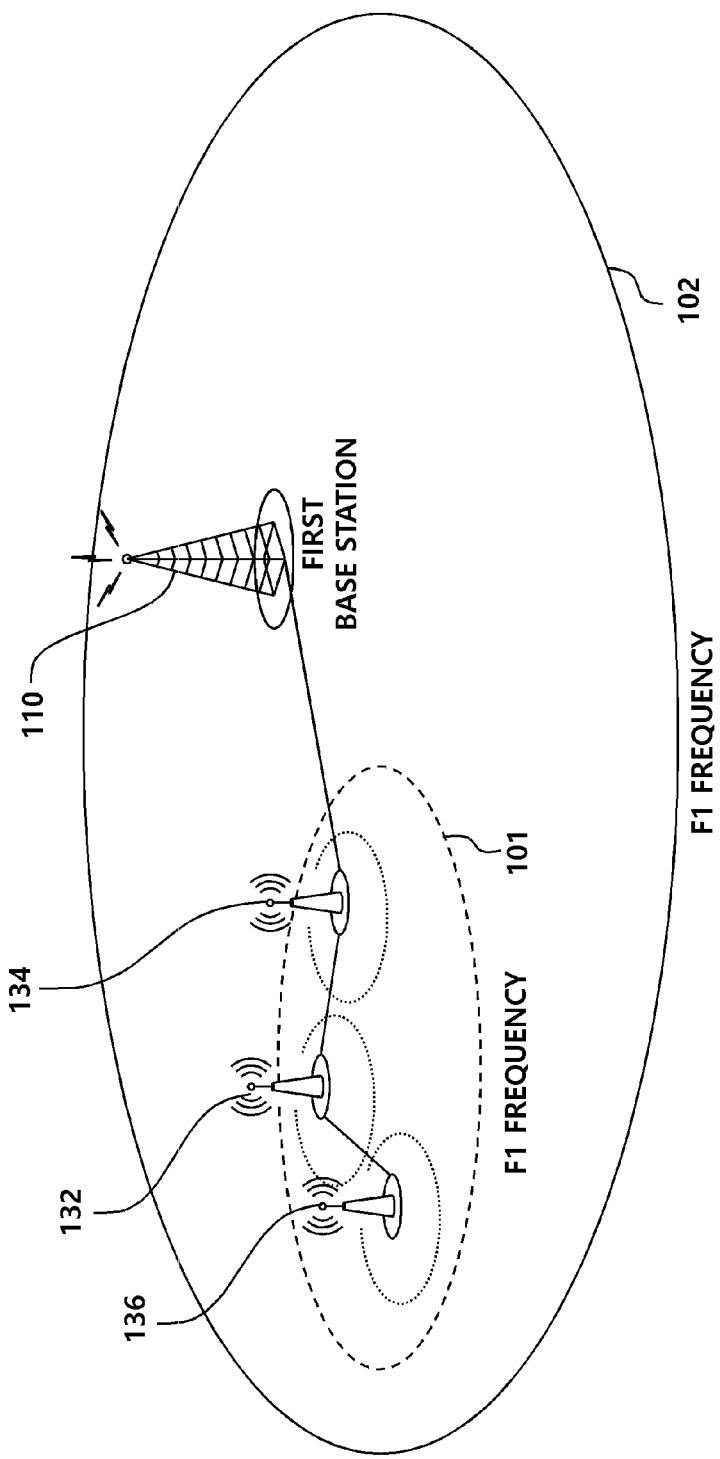
FIG. 1 is a diagram illustrating exemplary network configuration to which embodiments of the present disclosure are applicable.

Hereinafter, some embodiments of the present disclosure will be described with reference to the accompanying drawings. In the following description, it should be noted that the same elements will be designated by the same reference numerals as much as possible although they are shown in different drawings. Further, in the following description of the present disclosure, a detailed description of known functions and configurations incorporated herein will be omitted when it may make the subject matter of the present disclosure rather unclear.

The wireless communication system according to the present disclosure can be widely deployed to provide various communication services such as voice, packet data, and so on. The wireless communication system includes a User Equipment (UE) and a base station (BS or eNB). The UE in this specification is a comprehensive concept that refers to a UE in wireless communication, and should be construed as a concept including a Mobile Station (MS) in global systems for mobile communication (GSM), a User Terminal (UT), a Subscriber Station (SS), a wireless device, etc., as well as a User Equipment (UE) in wideband code division multiple access (WCDMA) and long term evolution (LTE), high speed packet access (HSPA), etc.

A base station or cell generally refers to a point (station) for communicating with the UE, and may be referred to as another terminology such as Node-B, evolved Node-B (eNB), sector, site, a Base Transceiver System (BTS), an Access Point (AP), a relay node, a Remote Radio Head (RRH), a Radio Unit (RU), a small cell and the like.

That is, the base station or cell in the specification should be construed as a comprehensive concept indicating some areas or functions covered by a Base Station Controller (BSC) in CDMA, Node-B of WCDMA, eNB or sector (site) in LTE, and a means that encompasses various coverage areas of a mega cell, a macro cell, a microcell, a pico cell, a femtocell, and a relay node, a remote radio head (RRH), a radio unit (RU), a small cell communication coverage, and the like.

Since various cells described above have a base station for controlling each cell, the base station may be interpreted in two ways. i) The base station may be a device itself that provides a mega cell, macro cell, microcell, pico cell, femtocell, or small cell with respect to the wireless area, or ii) The base station may indicate the wireless area itself. In step i), devices which provide a predetermined wireless area are controlled by the same object, or all devices which cooperate therebetween so as to configure the wireless area are directed to the base station. According to a method for configuring the wireless area, eNB, RRH, an antenna, RU, LPN, a point, transmission/reception point, a transmission point, reception point, etc. become an embodiment of the base station. In step ii), a wireless area itself which will receive or transmit a signal from a viewpoint of a UE or a neighboring base station can be directed to the base station.

Thus, the mega-cell, macro cell, micro cell, pico cell, a femtocell, small cell, RRH, antenna, RU, Low Power Node (LPN), point, eNB, transmission/reception point, transmission point, and reception point are collectively referred to as the base station.

The UE and the base station used herein refer to two transmitting and receiving entities in a comprehensive meaning, which are used to implement the techniques or spirit described herein, and are not limited to the specific terms or words. The UE and the base station used herein refer to two (e.g., uplink or downlink) transmitting and receiving entities in a comprehensive meaning, which are used to implement the techniques or spirit described herein, and are not limited to the specific terms or words. Here, the uplink (UL) refers to a method for transmitting and receiving data to and from the base station by the UE, and the downlink (DL) refers to a method for transmitting and receiving data to and from the UE by the base station.

There is no limit to a multiple access technique that is applied to the wireless communication system. Various multiple access techniques such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, and OFDM-CDMA may be used. An embodiment of the present disclosure can be applied to resource allocation of asynchronous wireless communication evolving to LTE and LTE-Advanced through GSM, WCDMA, and HSPA, and a synchronous wireless communication field evolving to CDMA, CDMA-2000, and UMB. The present disclosure is not limited to a particular wireless communication field, or is not to be construed as limited, and it should be construed to include all technical fields to which the spirit of the present disclosure can be applied.

The UL transmission and DL transmission may use a Time Division Duplex (TDD) scheme that transmits a signal using different times, or use a Frequency Division Duplex (FDD) scheme that transmits the signal using different frequencies.

In addition, LTE or an LTE-Advanced system forms the uplink and the downlink based on single carrier or paired carrier so as to form a standard. The uplink and the downlink transmit control information through a control channel such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), etc., and are configured for a data channel such as a Physical Downlink Shared Channel (PDSCH) and Physical Uplink Shared Channel (PUSCH) so as to transmit data.

On the other hand, the control information may also be transmitted using an enhanced PDCCH or extended PDCCH (EPDCCH).

In the specification, a cell may mean a component carrier which has a coverage of the signal transmitted from the transmission/reception point, a coverage of the signal transmitted from the transmission/reception point, or the transmission/reception point itself.

In accordance with at least one embodiment, the wireless communication system may be a Coordinated Multi-Point Transmission/Reception System (CoMP system) which transmits a signal by the cooperation of two or more transmission points, a coordinated multi-antenna transmission system, or a coordinated multi-cell communication system. The CoMP system may include two or more multiple transmission/reception points and UEs.

The multiple transmission/reception points may be at least one RRH having high transmission power or low transmission power within the macro cell, in which the RRH is connected to the base station or macro cell (hereinafter, referred to as 'eNB') through an optical cable or an optical fiber and wiredly controlled.

Hereinafter, the downlink (DL) refers to a communication or a communication path from the multi transmission/reception point to the UE, and the uplink (UL) refers to a communication or a communication path from the UE to the multi transmission/reception point. In the downlink, the transmitter may be a part of the multi transmission/reception point, and the receiver may be a part of the UE. In the uplink, the transmitter may be a part of the UE, and the receiver may be a part of the multi transmission/reception point.

Hereinafter, a situation where the signal transmitted and received through channels such as PUCCH, PUSCH, PDCCH, PDSCH, etc. may be referred to as transmitting and receiving the PUCCH, PUSCH, PDCCH, EPDCCH, and PDSCH.

Further, in the following, the description of "transmitting or receiving the PDCCH" or "transmitting or receiving a signal through the PDCCH" may be used as a meaning including "transmitting or receiving the EPDCCH" or "transmitting or receiving a signal through the EPDCCH".

That is, the physical downlink control channel to be described in the following may mean the PDCCH, or the EPDCCH, and also is used as a meaning including both the PDCCH and the EPDCCH.

In addition, for the convenience of explanation, the EPDCCH of an embodiment of the present disclosure may be applied to a part explained as the PDCCH, and the EPDCCH of an embodiment of the present disclosure may be applied to a part explained as the EPDCCH.

On the other hand, high layer signaling described in the following includes RRC signaling for transmitting RRC information including an RRC parameter.

The eNB performs downlink transmission to the UEs. The eNB may transmit the physical downlink shared channel (PDSCH) which is a main physical channel for unicast transmission, and the Physical Downlink Control Channel, PDCCH) for transmitting downlink control information which is required for receiving the PDSCH, such as scheduling, and scheduling grant information which is required to transmit a uplink data channel (for example, the Physical Uplink Shared Channel (PUSCH)). Hereinafter, the description that "signals are transmitted and received through each channel" will be described in the form of "the corresponding channel is transmitted and received".

Small cells using low power nodes are considered as a means for coping with the mobile traffic explosion. The low power node indicates a node that uses transmission (Tx) power smaller than that of a general macro node.

A Carrier Aggregation (hereinafter, refer to as 'CA') technology prior to 3GPP Release 11 may build a small cell within the macro cell coverage using a low power Remote Radio Head (RRH) of geographically dispersed antenna.

However, in order to apply the above mentioned CA technology, the macro cell and the RRH cell are built to be scheduled under the control of a single base station, and to this end, a construction of an ideal backhaul is required between the macro cell node and the RRH.

The ideal backhaul means a backhaul indicating a very high throughput and very small delay, such as a private point-to-point connection which uses an optical path (optical fiber) or LOS microwave (Line Of Sight microwave).

On the other hand, a backhaul indicating a relatively low throughput and large delay, such as xDSL (Digital Subscriber Line) and Non-LOS microwave, is referred to as non-ideal backhaul.

A plurality of serving cells may be combined through the single base station based CA technique described above to provide a service to the UE. That is, a plurality of serving cells may be configured for the UE being in a Radio Resource Control (hereinafter, referred to as 'RRC') connected state, and when the ideal backhaul is established between the macro cell node and the RRH, the macro cell and the RRH may be configured together as serving cells to provide a service to the UE.

When a CA technology based on the single base station is configured, the UE may have only one RRC connection with a network.

In the RRC connection establishment/re-establishment/handover, a single serving cell provides Non-Access Stratum (hereinafter, referred to as 'NAS') mobility information (e.g., referred to as Tracking Area Identity (TAI)), and a single serving cell provides a security input in the RRC connection re-establishment/handover. This cell is referred to as a Primary Cell (PCell). The PCell may be changed with the handover procedure only. Depending on the UE capabilities, Secondary Cells (SCells) together with the PCell may be configured as a serving cell.

In the CA technology based on the single base station described above, the SCell is serviced only as additional radio resources on the physical layer, the PCell may use Channel Quality Indicator (CQI) for detecting a wireless link problem from the SCell, and a measurement result. In addition, if a radio link problem occurs in the SCell, since the PCell is able to deactivate/remove the SCell, a Radio Link Monitoring (RLM) UE procedure was not applied to the SCell.

A multi-carrier property of the physical layer in the CA based on the single base station described above was influenced only by Medium Access Control (MAC) layer. The MAC layer has a single independent Hybrid Automatic Retransmit request (HARQ) entity for each serving cell in the uplink and downlink. Furthermore, each HARQ entity processes a data stream of a Component Carrier (CC).

In the CA based on the single base station, the addition and removal of the SCells are performed by the RRC connection reconfiguration message. When adding a new SCell, dedicated RRC signaling is used in order to transmit all the necessary system information of the SCell. That is, in the connected mode, the UE does not need to directly acquire the broadcast system information.

When the RRC connection reconfiguration message received from the PCell includes SCell add and modify list (sCellToAddModList), the UE performs the addition or modification of the SCell. That is, the UE adds an SCell corresponding to a cell identification for each SCell index (sCellIndex) included the SCell add and modify list (sCellToAddModList), not a part of the current UE configuration.

In addition, the UE configures the SCell so as to be considered as being in a deactivated state in the lower layer. The UE modifies the SCell configuration for each SCell index (sCellIndex) included in the SCell add/modify list (sCellToAddModList) which corresponds to a part of the current UE configuration.

As described above, in order to use the resource of the added/modified SCell, the deactivated SCell should become to be activated. That is, a carrier of the SCell can be used through the activation step which is separated from the SCell addition step.

Therefore, during the configuration of SCell addition by the UE, SCell add failure does not occur due to the failure of SCell radio link. That is, in the typical CA technology based on the single base station, since the configuration of radio resources for using radio resources provided by at least two different network points is performed through an RRC message including the SCell addition information in the PCell, and radio resources configured through the separated activation step are used, it was not necessary to consider the SCell radio link failure in a process of the configuration of radio resources of the SCell.

However, in a dual connectivity configuration of the present disclosure to be described in detail in the following, it is necessary to consider the radio link failure of a cell to be added when a cell associated with a second base station is additionally configured by the UE.

Unlike the above-described CA technology based on the single base station, the double connectivity technology indicates an operation of using radio resources provided by at least two different network points (for example, a master base station and a secondary base station) which are connected by a non-ideal backhaul.

For example, the dual connectivity is a technique for transmitting and receiving data, by the UE, through the cell associated with each of two different base stations, and is a technique for processing high-speed large-capacity data of the UE.

The present disclosure provides a method and device for handling a radio link failure problem, etc. arising from the process of adding/modifying secondary base station radio resources in configuring the dual connectivity by the UE.

Accordingly, the meaning of each word in dual connectivity to which the present disclosure is applicable may be different from that of the CA.

Hereinafter, according to the present specification, in configuring the dual connectivity by the UE, a base station for forming the RRC connection with the UE and providing the PCell which serves as a reference for a handover, or a base station which terminates the S1-MME and serves as a mobility anchor with respect to a core network is described as a master base station or a first base station.

The master base station or the first base station may be a base station that provides the macro cell, and may be a base station that provides any one small cell in a situation where the dual connectivity is established between the small cells.

On the other hand, a base station that is distinguished from the master base station in a dual connectivity configuration to provide additional radio resources to the UE is described as the secondary base station or a second base station.

The first base station (master base station) and the second base station (secondary station) may individually provide radio resources through at least one cell to the UE, and the first base station and the second base station may be connected through an interface therebetween.

In addition, hereinafter, in order to give an understanding of the present disclosure, a cell associated with the first base station may be described as a macro cell, and a cell associated with the second base station may be described as a small cell. However, in a small cell cluster scenario described below, a cell associated with the first base station may also be described as the small cell.

The macro cell in the present disclosure may mean one or more cells, and the macro cell may be described as a means for collectively referring to all cells associated with the first base station. The macro cell in the present disclosure may mean one or more cells, and the macro cell may be described as a means for collectively referring to all cells associated with the second base station. However, as described above, in a particular scenario such as a small cell cluster, the macro cell may be a cell associated with the first base station, and in this case, the cell of the second base station may be described as another small cell or still another small cell. On the other hand, all the cells associated with the first base station refer to a master cell group, and all the cells associated with the second base station may mean a secondary cell group. The cell groups may be used as a meaning for distinguishing the base station configuring or controlling the radio resource from the viewpoint of the UE. For example, the master cell group may be used to distinguish between the master base station and the first base station from the viewpoint of the UE, and the secondary cell group may be used to distinguish between the secondary base station and the second base station.

In addition, the UE may perform communication through a plurality of cells associated with the first base station and a plurality of cells associated with the second base station described above, and in this case, a particular cell that serves the above described PCell function among the plurality of cells associated with the first base station may be described as the first base station PCell, and a particular cell among the plurality of cells associated with the second base station may be described as of the second base station PCell. The second base station PCell means a cell for performing all or a part of functions of the above-mentioned PCell.

In the typical CA technology described above, when different base stations are connected through the non-ideal backhaul, it may not be configured to use radio resources provided by different network points. In particular, in the typical CA technology based on the single base station, it is not necessary to consider SCell radio link failure in a SCell configuration process.

Accordingly, in a dual connectivity configuration to which the present disclosure is applicable, a problem may occur such as a secondary base station radio link failure or an exceptional situation in a process of configuring additional radio resources that can be provided by a secondary base station connected through non-ideal backhaul.

The present disclosure devised to solve this problem may provide a specific configuration procedure for using radio resources provided by one or more different base stations connected through a non-ideal backhaul. In particular, the present disclosure is to provide a method and device capable of handling a problem such as radio resource link failure, etc. which has occurred in a process of providing the additional radio resources that can be provided by the secondary base station in order to use radio resources provided by one or more different base stations connected through the non-ideal backhaul.

At first, each deployment scenario of the dual connectivity network configuration connected through the non-ideal backhaul to which embodiments of the present disclosure are applicable will be described with reference to the drawings.

FIG. 1 is a diagram illustrating an exemplary a network configuration to which the present disclosure is applicable.

Referring to FIG. 1, a macro cell 102 is provided by the first base station 110 and small cells (e.g., small cell cluster 101) are provided by second base stations 132, 134, and 136. The macro cell 102 and small cells 101 may have the same carrier frequency F1.

The first base station 110 provides the macro cell, and the macro cells 132, 134, and 136 provide each of the small cells. The first base station 110 and the macro cells 132, 134, and 136 are connected through the non-ideal backhaul. Small cells are built in the overlaid macro cell 102 network. An outdoor small cell environment and a small cell cluster 101 may be considered.

The UE may configure dual connectivity between the macro cell and the small cell in the small cell cluster 101 and may be provided with a plurality of serving cells. In addition, the UE may perform communication by configuring the dual connectivity between the first base station 110 and the second base stations 132, 134, and 136.

Figure 2:
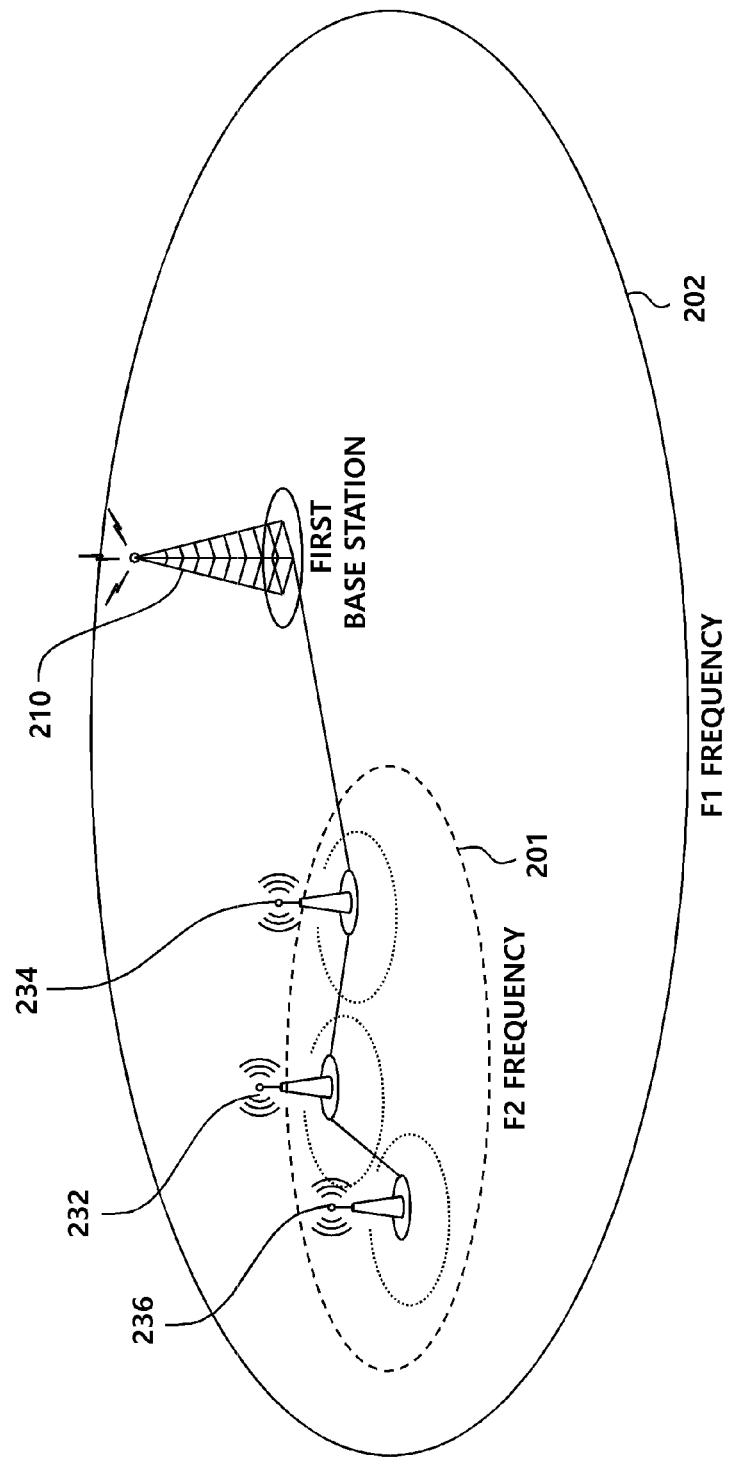
FIG. 2 is a diagram illustrating another exemplary network configuration to which embodiments of the present disclosure are applicable.

FIG. 2 is a diagram illustrating another exemplary network configuration to which the present disclosure is applicable.

Referring to FIG. 2, the macro cell 202 and the small cells 201 may have different carrier frequencies F1 and F2.

A first base station 210 provides the macro cell, and second base stations 232, 234, and 236 provide each of the small cells. The first base station 210 and the second base stations 232, 234, and 236 are connected through the non-ideal backhaul. Small cells are built in the overlaid macro cell 202 network. An outdoor small cell environment and a small cell cluster 201 may be considered.

The UE may be provided with a plurality of serving cells through the dual connectivity between the macro cell and the small cells in the small cell cluster 201. In this case, the frequencies of each of the serving cells may be different from each other as frequencies F1 and F2 as shown in FIG. 2.

Figure 3:
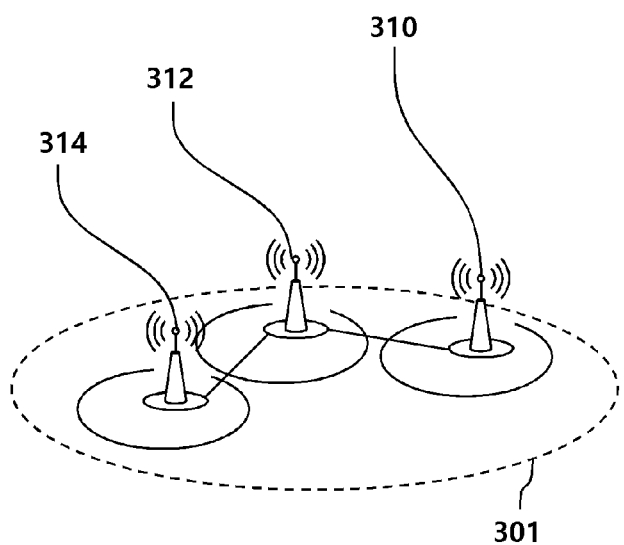
FIG. 3 is a diagram illustrating still another exemplary network configuration to which embodiments of the present disclosure are applicable.

FIG. 3 is a diagram illustrating another exemplary network configuration to which the present disclosure is applicable.

Referring to FIG. 3, a plurality of small cells may form a small cell cluster 301. In this case, base stations 310, 312, and 314 for providing small cells are connected therebetween through the non-ideal backhaul. An interior small cell environment and the small cell cluster environment 301 are considered.

In the case of FIG. 3, a first base station may be any one base station among a plurality of base stations for providing small cells, and a second base station may be base stations other than the first base station. The UE may configure dual connectivity between the first base station and the second base station to transmit and receive data through a plurality of serving cells.

In the scenarios of FIGS. 1 and 2 according to an embodiment of the present disclosure, the UE may transmit user plane data through one or more second base stations under a control of the first base station.

On the other hand, the UE may transmit the user plane data through cooperation between the first base station and one or more second base stations.

On the other hand, in the scenario of FIG. 3, the UE may transmit the user plane data through cooperation between the first base station and the second base station.

That is, for the transmission of control plane data, the UE may configure a single RRC connection with the first base station and configure one or more Data Radio Bearers (DRBs) with the first base station and second base station. To this end, the UE configured RRC connection with the first base station may configure additional radio resources of the second base station connected through non ideal backhaul.

As another example of the present disclosure, the UE may transmit user plane data to the first base station only or the second base station only through the cooperation of the first base station and one or more second base stations under the control of the first base station, in the scenarios of FIG. 1 and FIG. 2, or through the cooperation of the first base station and the second base station in the scenarios of FIG. 3. That is, for the transmission of control plane data, the UE may configure a single RRC connection with the first base station and configure one or more DRBs through the first base station only. The UE may additionally or alternatively configure one or more DRBs through the second base station only.

Hereinafter, a process of UE for adding the configuration of additional radio resources of the second base station in order to configure dual connectivity will be described with reference to the drawings.

Figure 4:
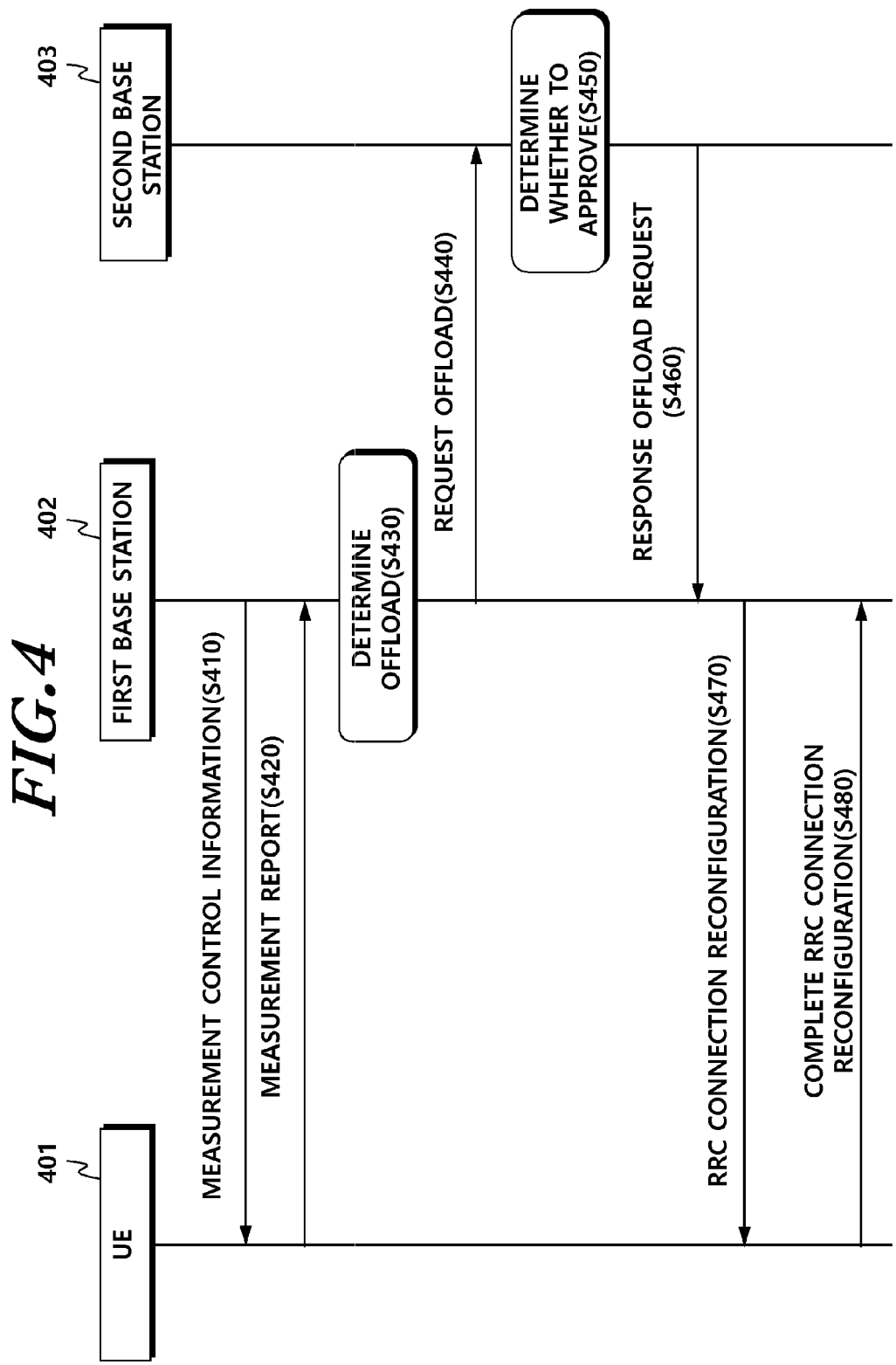
FIG. 4 is a diagram illustrating an exemplary operation of a base station and a UE for additionally configuring a radio resource of a second base station according to an embodiment of the present disclosure.

FIG. 4 is a diagram exemplarily illustrating operations of a base station and a UE for adding and configuring a radio resource of a second base station according to an embodiment of the present disclosure.

Referring to FIG. 4, the first base station 402 transmits a message for controlling a measurement operation of the UE 401 in step S410. The UE 401 performs a measurement based on the measurement control information received from a first base station 402. That is, the UE 401 measures a channel quality in a cell associated with the second base station based on the measured control information and measures the channel quality of the cell associated with the first base station.

The UE 401 transmits a measurement report including the measured result information to the first base station 402 in step S420. The measurement report may be transmitted at a particular time point based on the measurement control information, and the measurement report may be transmitted periodically.

The first base station 402 receives the measurement report from the UE 401 and determines whether to offload the UE 401 in step S430. For example, the first base station 402 determines whether to off-load the UE on the basis of a predetermined standard by combining information such as a quality of each channel included in data request and the measurement report of the UE 401.

When the first base station 402 decides offloading a part of data processing by the UE 401, the offload request message is transmitted to the second base station 403 in step S440. The above-mentioned message name is referred to for the convenience of explanation in configuring additional radio resources through the second base station and the embodiments of the present disclosure are not limited to the name. The second base station 403 is a base station which can provide additional radio resources to the UE 401 and perform some of the data processing of the UE. The first base station 402 may be determined based on the measurement report.

The second base station 403 receives an offload request from the first base station 402 and determines whether to approve or not in step S450.

When the second base station 403 determines approving the offload request of the first base station 402, a response for the offload request is transmitted to the first base station 402 in step S460.

The first base station 402 receives the approval information of the second base station 403 and transmits the high layer signaling including information for configuring additional radio resources of the second base station to the UE 401 in step S470. The high layer signaling may be an RRC connection reconfiguration message.

The UE 401 adds and configures radio resources of the second base station on the basis of a high layer signaling received from the first base station 402, and the UE 401 transmits a high layer signaling including second base station add complete information in step S480. The high layer signaling transmitted to the first base station 402 by the UE 401 may be, for example, an RRC connection reconfiguration complete message.

As described above, the UE may receive a message including configuration of additional radio resources information from the first base station. The UE may add and configure radio resources of the second base station. Thus, the UE may configure dual connectivity between the first base station and the second base station.

Hereinafter, each of the steps of configuring the dual connectivity by the UE according to the present disclosure is described in more detail with reference to FIG. 4. In addition, a method for handling a problem occurred when the configuration of additional radio resources of the second base station cannot be completed due to a problem occurring on a radio link, etc will be described. In the process of configuring the dual connectivity by the UE, and a method for returning to the previous configuration of additional radio resources are explained in detail.

In describing each step, a reference numeral is given to make easy understanding. However, the reference numeral of each step is given for the convenience of explanation and steps can be performed as a single process, or a single step may be divided into two or more steps so as to be performed.

First Embodiment: A Procedure and Method for Configuring Additional Radio Resources by the UE 1) The first base station configures a UE measurement procedure.

2) The UE is triggered to transmit a measurement report by a rule set.

3) The first base station decides offloading of the UE based on the measurement report and Radio resource Management (RRM) information.

For example, the first base station determines i) transmitting, through the first base station and the second base station, the user plane data through the first base station, or ii) transmitting, through the second base station, the user plane data through the first base station. On the other hand, the first base station determines transmitting a particular DRB(s) through the first base station by using radio resources of the first base station and the second base station, or a particular DRB(s) which uses the radio resources of the first base station by using the radio resources of the second base station.

4) The first base station transmits a message (e.g., the offload request message) for preparing the configuration of additional radio resources to the second base station.

The configuration of additional radio resources indicates the configuration of adding radio resources of the second base station to the UE, or changing of the radio resources of the second base station (e.g., deleting and adding the radio resources of the second base station).

As an example, the message (e.g., offload request message) for preparing the configuration of additional radio resources includes information (for example, AS-configuration, E-RAB context) necessary for preparing the configuration of additional radio resources by the second base station.

The first base station may transmit a message for preparing the configuration of additional radio resources. When a predetermined period of time has elapsed, the first base station may cancel a request for the configuration of additional radio resources.

Specifically, for example, when the first base station transmits the message (e.g., offload request message) for preparing the configuration of additional radio resources to the second base station, the first base station may start a timer for preparing the configuration of additional radio resources. The timer for preparing the configuration of additional radio resources indicates a timer that specifies and/or limits the maximum amount of time required for processing a message (e.g., offload request message) procedure for preparing the configuration of additional radio resources.

When the first base station does not receive a confirmation message (e.g., an offload request acknowledgment (ACK) message) with respect to the message for preparing the configuration of additional radio resources before the timer for preparing the configuration of radio resources has expired, the first base station may transmit, to the second base station, a message (e.g., an offload cancellation message) for cancelling the preparation of the configuration of additional radio resources in progress.

5) Admission for the offload may be controlled by the second base station. On the other hand, the second base station may not perform the admission decision for the E-RAB(s) determining the offload based on the E-RAB QoS profile in the first base station.

6) The second base station prepares L1/L2 additional radio resource configuration. In one example, the second base station configures or prepares L1/L2 entity for the accepted E-RAB(s) or offload requested E-RAB(s).

The second base station transmits a message for confirming the configuration of additional radio resources to the first base station (e.g., an offload request acknowledgment (ACK) message). The message for confirming the configuration of additional radio resources is, for example, the offload request response message or a concept including the offload request ACK message. The message for confirming the configuration of additional radio resources may include information required to generate an RRC message for configuring additional radio resources of the second base station to be transmitted by the first base station to the UE. The above-mentioned message name is referred to for the convenience of explanation in configuring additional radio resources through the second base station and the embodiments of the present disclosure are not limited thereto.

In another method, the message for confirming the configuration of additional radio resources may include the RRC message for configuring additional radio resources of the second base station to be transmitted by the first base station to the UE, and the RRC message is generated by an RRC layer of the second base station. The message for confirming the configuration of additional radio resources may include, if necessary, a dedicated RACH preamble, and other necessary parameters (for example, SIBs etc.).

The second base station may cancel the configuration of radio resources preparation when a predetermined period of time has elapsed after transmitting the confirmation message for the request for configuration of additional radio resources to the first base station.

Specifically, for example, the second base station may start a timer for the configuration of additional radio resources of the second base station after transmitting the message for confirming the configuration of radio resources to the first base station.

The timer for the configuration of additional radio resources of the second base station may indicate a timer to specify/limit the maximum amount of time required for a procedure of processing the configuration of additional radio resources in the second base station. The timer for the configuration of additional radio resources of the second base station can be stopped when the configuration of radio resources of the second base station is successfully completed.

When the additional radio resource configuration of the second base station is not successfully completed before the timer of the additional radio resource configuration of the second base station expires, the second base station may cancel the configuration of additional radio resources preparation in progress. To this end, when the first base station receives a success message (for example, RRC Connection Reconfiguration Complete) for the configuration of additional radio resources of the second base station from the UE, the first base station transmits a success message for the configuration of additional radio resources of the second base station.

If the first base station does not receive a success message (for example, RRC Connection Reconfiguration Complete) for the configuration of additional radio resources of the second base station from the UE, or if the first base station receives a failure message (for example, RRC Connection re-establish request or an RRC message including configuration of additional radio resources failure), the first base station transmits the failure message (or a cancellation message) for the configuration of additional radio resources of the second base station.

In another method, the second base station may use the timer for the additional radio resource configuration of the first base station to be described below, without separately configuring an additional radio resources timer of the second base station. For example, when the first base station does not receive a confirmation message (for example, RRC Connection Reconfiguration Complete) indicating that the first base station succeeds in performing the configuration of the additional radio resource before the timer for the configuration of additional radio resources of the first base expires, the first base station may transmit messages (e.g., offload cancellation message) for cancelling the configuration of additional radio resources preparation in progress of the second base station.

In the above, it has been described that the confirmation message for the request for configuring of additional radio resources transmitted to the first base station by the second base station may include an RRC message for configuring additional radio resources by the UE. In this case, the second base station may also include the aforementioned RRC message, wherein the RRC message is generated by the RRC layer of the second base station.

When the second base station transmits the aforementioned RRC message generated by the RRC layer of the second base station, the second base station may generate (additional support) an RRC entity for the UE.

In another method, when the second base station transmits the aforementioned RRC message generated by the RRC layer of the second base station, the second base station may not generate the RRC entity for the UE. On the other hand, when generating the RRC messages (or configuration of additional radio resources information) for configuring additional radio resources of the second base station, the second base station may delete the RRC message when receiving a success message for configuring additional radio resources or a failure (or cancel) message for configuring additional radio resources from the first base station after generating the RRC object.

The first base station having received, from the second base station, a message for the confirmation of the configuration of additional radio resources, stops the timer for preparing the configuration of radio resources. Then, the first base station starts a timer for the configuration of additional radio resources of the first base station.

In another method, the timer for the configuration of radio resources of the first base station may start after transmitting an RRC Connection Reconfiguration message to the mobile station by the first base station. The timer for the configuration of additional radio resources of the first base station may indicate a timer to specify/limit the maximum amount of time required for processing the configuration of additional radio resources procedure in the first base station.

If the first base station does not successfully complete the configuration of additional radio resources procedure before the timer for the configuration of additional radio resources expires, the first base station may transmit a message (e.g., an offload cancellation message) for cancelling the configuration of additional radio resources preparation in progress of the second base station. Then, the first base station performs communication using the configuration of radio resources through the first base station.

For example, when the first base station does not receive a success message (for example, RRC Connection Reconfiguration Complete) for the configuration of additional radio resources of the second base station from the UE, or when the first base station does not forward the success message received from the UE of the second base station, the first base station may determine that the configuration of additional radio resources procedure is not successfully completed.

If the second base station does not accept at least one E-RAB, or when a failure occurs during a message process for preparing the configuration of radio resources, the second base station transmits the configuration of additional radio resources preparation failure message (e.g., an offload failure message) to the first base station. The additional radio resource fail message may include cause information (e.g., Cause IE) having an appropriate value.

If the first base station does not receive a response (e.g., an offload request acknowledgment (ACK) messages) for the message (e.g., an offload request message) for preparing the configuration of additional radio resources until the timer for the configuration of additional radio resources preparation described above expires, the first base station may transmit the message (e.g., an offload cancellation message) having the appropriate value for the cause information (e.g., Cause IE) of the second base station in order to cancel the configuration of additional radio resources preparation being in progress.

If there is no response for the message for preparing the configuration of additional radio resources (e.g., offload request message) until the timer for the configuration of additional radio resources preparation expires, the first base station may cancel the message (e.g., offload request message) procedure for preparing the configuration of additional radio resources.

As described above, the first base station and/or the second base station may individually transmit the message for configuring additional radio resources to the UE, and the first base station and/or the second base station may operate the timer related thereto so as to cancel the procedure.

Hereinafter, in configuring additional radio resources by the UE, described will be an operation which becomes different depending on the method of configuring a radio bearer by the UE and the base station.

When configuring the radio bearer for the configuration of additional radio resources not to be bearer split to the UE, the first base station may buffer a data packet.

For example, such a case of configuring the radio bearer not to be bearer split may be configuring the radio bearer (DRB), was configured for transmitting user data using first base station radio resources or through the first base station, to transmit the user data using the second base station radio resource or through the second base station.

In this case, the first base station may buffer the data packet during a next period to avoid missing the data transmitted to the UE.

For the period of time for buffering the data packet, for example, the first base station may buffer the data packet until receiving the RRC connection reconfiguration complete message from the UE after receiving a message for the confirmation of the configuration of additional radio resources from the second base station or transmitting an RRC connection reconfiguration message to the UE.

In another method, the first base station may continuously transmit data to the UE using the first base station radio resource instead of buffering the data packets during the above period of time.

In another method, the first base station may transmit Sequence Number STATUS TRANSFER of the second base station in order to preserve a PDCP status to transmit the uplink PDCP SN receiver status and downlink PDCP SN transmitter status for the corresponding radio bearer (E-RABs). Then, the data of the first base station can be transmitted of the second base station.

On the contrary, if the radio bearer for the configuration of additional radio resources is configured so as to be bearer split, the first base station may continuously transmit data to the base station using the first base station radio resource.

Specifically, for example, when configuring the radio bearer (DRB) configured to transmit the user data through the first base station so as to configure to transmit the user data through the first base station and the second base station (using the first base station radio resources and the second base station radio resources), the first base station may continue the data transmission through the first base station during the above period of time.

When the radio bearer for the additional radio resource is configured so as to be split by using another method, the data packet can be buffered during the above period of time.

7) The first base station transmits the RRC connection reconfiguration message to the UE. The RRC connection reconfiguration message described as an example may include information indicating the message for configuring additional radio resources of the second base station.

The information on configuring additional radio resources of the second base station will be described in detail as an example.

8) When the UE receives the RRC connection reconfiguration message including information for the configuration of additional radio resources of the second base station, the UE may start a timer to limit the configuration of additional radio resources of the UE.

The timer for limiting the time of configuration of additional radio resources for the UE may be a timer (for example, a T304 timer, or an ARRC timer distinguished from the T304 timer) included in the information for the configuration of additional radio resources of the second base station included in the RRC Connection Reconfiguration message. In another method, the aforementioned timer value may be a predetermined value configured by the UE.

When the configuration of radio resources is successfully completed before the timer for limiting the configuration of additional radio resources for the UE expires, the UE may stop the timer for limiting the time of configuration of additional radio resources of the UE.

For example, the successful completion of the configuration of additional radio resources of the UE may mean at least one of an RRC connection reconfiguration complete message transmission, successful uplink synchronization by MAC, and a successful completion of random access process with the second base station.

If the timer expires before the configuration of additional radio resources is successfully completed, the UE may return to the original configuration of radio resources (e.g., the configuration before receiving the RRC Connection Reconfiguration message) used by the first base station. For example, when the information for configuring radio resources included in the above-mentioned RRC connection reconfiguration message includes radio bearer add/modify information for configuring so as to transmit the user data through the second base station (using the second base station radio resource), wherein the radio bearer is configured to transmit the user data through the first base station (so as to use the first base station radio resource), data transmission may be resumed using a data radio bearer (DRB) configuration configured through the first base station (so as to use the first base station radio resource).

On the other hand, when the information for configuring radio resources included in the above-mentioned RRC Connection Reconfiguration message includes radio bearer add/modify information for configuring so as to transmit the user data through the first base station and the second base station (using the first base station radio resources and the second base station radio resources), wherein the radio bearer has been configured to transmit the user data through the first base station (so as to use the first base station radio resources), data transmission may be resumed using radio bearer (DRB) configuration configured through the first base station (so as to use the first base station radio resource).

In addition, the information on a failure of the configuration of additional radio resources may be stored in a new information element for a VarRLF-Report or a second base station failure of the configuration of additional radio resources report, or information indicating failure of the configuration of additional radio resources of the second base station may be transmitted to the first base station. The information on a failure of the configuration of additional radio resources included in the new information element for the VarRLF-Report or a report of failure of the configuration of additional radio resources of the second base station, or the information indicating failure of the configuration of additional radio resources of the second base station will be described as an example in detail below.

The operation on the failure of the configuration of additional radio resources according to each embodiment of the present disclosure will be further described in detail with reference to the drawings hereinafter.

Figure 5:
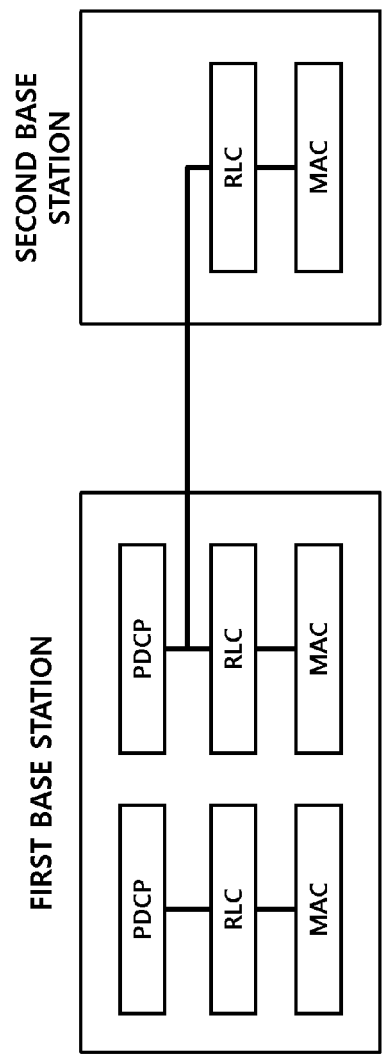
FIG. 5 is a diagram illustrating an exemplary bearer split configuration of additional radio resources which additionally configures a radio resource of a second base station according to another embodiment of the present disclosure.

FIG. 5 is a diagram illustrating an example of a bearer-separated configuration of additional radio resources which additionally configures a radio resource of a second base station in accordance with another embodiment of the present disclosure.

Unlike the typical CA technology as described above, in configuring the dual connectivity, the UE may perform configuration of additional radio resources and the second base station access procedure altogether or sequentially. The second base station access procedure indicates an access procedure of the second base station PCell. Specifically, the UE may, if necessary, perform synchronization with the second base station, and access the second base station through an RACH. That is, the UE may perform the synchronization with the second base station, and configure the additional radio resource through the second base station prior to accessing the second base station through the RACH. On the other hand, the UE may perform the synchronization with the second base station, and configure the additional radio resources through the second base station while accessing the second base station through the RACH. On the other hand, the UE may perform the synchronization with the second base station, and configure the additional radio resources through the second base station after accessing the second base station through the RACH.

For example, referring to FIG. 5, when the existing radio bearer configured to transmit the user data through the first base station is to transmit through the first base station and the second base station after bearer-splitting the radio bearer, with respect to each DRB identity included in the radio bearer add/modify information (DRB-ToAddMod) which is a part of the current UE configuration, if the RLC RLC-config is included in the DRB identity, the RLC object or objects are reconfigured according to the received RLC-config.

For example, RLC-config may include an RLC-config of the UE RLC entity aimed at the first base station RLC entity, and RLC-config of the UE RLC entity aimed at the second base station RLC entity. Specifically, the RLC-config may be configured for RLC-config of the UE RLC entity aimed at the second base station RLC entity by re-establishing the UE RLC objects aimed at the first base station RLC entity and establishing the UE RLC entity aimed at the second base station.

If logicalChannelConfig is included in the RLC-config, a logical channel is reconfigured according to the received logicalChannelConfig.

The RLC-config and/or logicalChannelConfig may include new information for the configuration of bearer split additional radio resources.

Figure 6:
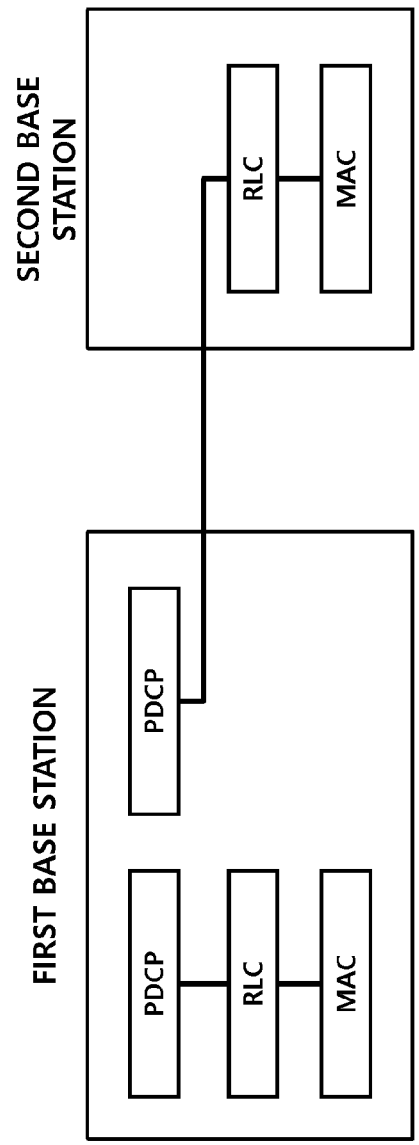
FIG. 6 is a diagram illustrating an exemplary no-bearer-split configuration of additional radio resources which additionally configures a radio resource of a second base station according to another embodiment of the present disclosure.

FIG. 6 is a diagram illustrating an example of a bearer non-split configuration of additional radio resources which additionally configures a radio resource of a second base station according to another embodiment of the present disclosure.

Referring to FIG. 6, the first base station may configure a PDCP entity and an RLC entity and a MAC entity may be configured in the second base station.

Figure 7:
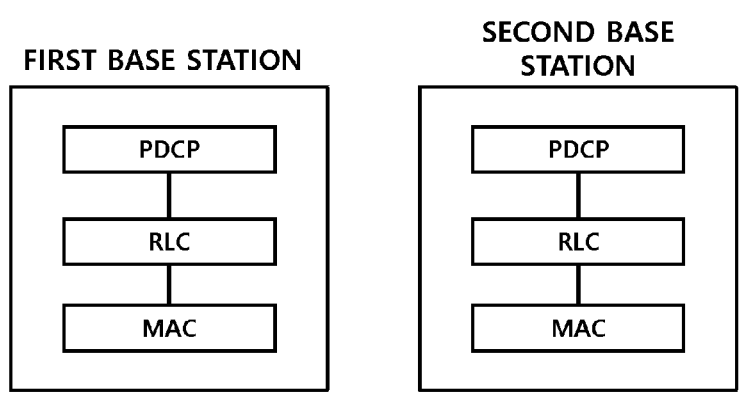
FIG. 7 is a diagram illustrating another an exemplary no-bearer-split configuration of additional radio resources which additionally configures a radio resource of a second base station according to another embodiment of the present disclosure.

FIG. 7 is a diagram illustrating a no-bearer-split configuration of additional radio resources which additionally configures a radio resource of a second base station according to another embodiment of the present disclosure.

Referring to FIG. 7, the first base station and the second base station may configure a PDCP entity, an RLC entity, and a MAC entity, respectively.

As shown in FIG. 6 and FIG. 7, this case can be configured such that each radio bearer is configured through the first base station or the second base station without splitting the radio bearer through the first base station and the second base station.

When describing with reference to FIG. 6 and FIG. 7, when the radio bearer configured through the first base station is to be transmitted through the second base station without bearer split, with respect to each DRB identity included in the radio bearer add/modify information (DRB-ToAddMod) which is a part of the current UE configuration, if the RLC-config (RLC-config of the UE RLC entity aimed at the second base station RLC entity) is included in the DRB identity, the RLC object or objects are reconfigured according to the received RLC-config.

For example, the UE RLC entity aimed at the first base station RLC entity is re-established by the RLC-config of the UE RLC entity aimed at the second base station RLC entity. If logical Channel Config is included in the RLC-config, a logical channel is reconfigured according to the received logicalChannelConfig. The logicalChannelConfig may include new information for the configuration of the bearer split additional radio resources.

If the UE configures the additional radio resource through the second base station, the UE may transmit the RRC connection reconfiguration complete message to the first base station. For example, the UE may perform synchronization with the second base station, additional radio resource configuration through the second base station prior to accessing the second base station through a RACH, and transmit the RRC connection reconfiguration complete message to the first base station.

For another example, the UE may perform synchronization with the second base station, configure the additional radio resource through the second base station while accessing the second base station through the RACH, and transmit the RRC connection reconfiguration complete message to the first base station. Specifically, the UE may transmit an RRC connection reconfiguration complete message to the first base station after performing downlink synchronization with the second base station and configuring additional radio resources through the second base station. Hereinafter, the UE may access the second base station through the RACH. On the other hand, if the additional radio resource is configured for the UE through the second base station while the UE performs the downlink synchronization with the second base station and accesses of the second base station through the RACH, the UE may transmit the RRC connection reconfiguration complete message to the first base station even when a random access with the second base station is not completed.

For another example, the UE may perform synchronization with the second base station, configure the additional radio resource through the second base station after accessing the second base station through the RACH, and transmit the RRC connection reconfiguration complete message to at least one of the first base station and the second base station.

In another method, the UE may add/modify the radio resource to the UE according to the radio bearer add/modify information (DRB-ToAddMod) received through the RRC connection reconfiguration message only when the UE may successfully access the second base station. For example, only in a state where the second base station radio resource is already configured before receiving the RRC connection reconfiguration message so that the UE may communicate through the second base station, or in a state where the UE successfully completes a random access process with the second base station (for example, when the UE attempts to access the second base station by using the RACH preamble generated by the second base station and received from the first base station, and receives a random access response (RA Response) message from the second base station), the UE may add/modify the radio bearer for configuring additional radio resources through the second base station.

When the UE successfully accesses the second base station, the UE may transmit the RRC connection reconfiguration complete message to at least one of the first base station and the second base station. A method for transmitting the RRC connection reconfiguration complete message to the first base station by the UE will be described as an example below.

The first base station having received the RRC connection reconfiguration complete message transmits a success message for configuring additional radio resources of the second base station, and the first base station starts the transmission of the data to the UE through the second base station.

In the above, procedures for configuring additional radio resources by the first base station, the second base station, and the UE according to the present disclosure have been described in detail with reference to FIG. 4 to FIG. 7.

Hereinafter, a processing method according to the present disclosure with respect to a case where a problem occurs, when performing the configuration of additional radio resources of the second base station by the UE, in step 8 of procedures for the configuration of additional radio resources, will be described with reference to the drawings.

Second Embodiment: A Processing Procedure and Method According to the Occurrence of the Problem During the Configuration of Additional Radio Resources In the process of FIG. 4 to FIG. 7 described above, the random access problem with the second base station may occur in the process of configuring additional radio resources by the UE unlike the typical CA technology, so as to cause a problem of not completing the configuration of additional radio resources.

In this case, the UE may solve the problem by resuming existing configuration of radio resources using the radio resource of the first base station before configuring additional radio resources of the second base station.

Hereinafter, specific methods and procedures for resuming existing configuration of radio resources when the problem occurs during the configuration of additional radio resources of the second base station according to another embodiment of the present disclosure will be explained with reference to the drawings.

FIG. 8 is a diagram showing an exemplary operation of a UE and a base station when additional radio resource configuration fails according to another embodiment of the present disclosure.

According to another embodiment of the present disclosure, provided is a method for configuring a dual connection with multiple base stations by a UE. The method includes: receiving, from a first base station, a first signal including information indicating additional radio resource configuration through a second base station; starting a timer included in the first signal; attempting a random access with the second base station; and when the timer expires, transmitting, to the first base station, a second signal including information indicating failure of the additional radio resource configuration.

Referring to FIG. 8, the first base station 802 transmits, to a UE 801, a first signal including information indicating configuration of additional radio resources through the second base station in step S810.

The first signal may include an RRC connection reconfiguration message described in FIG. 4, additional information indicating the additional radio resource configuration through the second base station, and information required to configure additional radio resources through the second base station by the UE.

The UE 801 configures the additional radio resource on the basis of the received first signal in step S820. For example, the UE 802 may configure a bearer split or a no-bearer-split radio bearer based on the first signal. On the other hand, the existing RLC entity, etc. is configured as an RLC entity mapped to the first base station based on the first signal, and an RLC entity, etc. mapped of the second base station may be configured.

The UE 801 may attempt a random access to the second base station 803 before configuring the additional radio resource, while configuring the additional radio resource, or after configuring additional radio resources in step S830. In the above, it has been described that the random access is attempted after configuring additional radio resources only for the convenience of explanation. However, the embodiments of the present disclosure are not limited thereto. For example, the random access may be attempted before or during the configuration of additional radio resources as described above. That is, the order of step S820 and step S830 may be changed, and the step S820 and step S830 may be performed simultaneously.

If the UE 801 attempts the random access of the second base station 803 after configuring the additional radio resource, the UE 801 may further include transmitting the RRC Connection reconfiguration complete message based on the received first signal after the configuration of additional radio resources in step S820 or before the random access attempting process in step S830. On the other hand, even when the UE 801 attempts the random access of the second base station 803 after configuring the additional radio resource, the UE 801 may successfully complete (for example, random access response message reception), based on the received first signal, the configuration of additional radio resources in step S820 and the random access attempting process in step S830, and then transmit the RRC Connection reconfiguration complete message. When the UE 801 configures the additional radio resource based on the first signal, and if the configuration of additional radio resources has failed, or the connection with the second base station 803 has failed in step S840, the UE 801 transmits the second signal to the first base station 802 in step S850. The step S840, in which the configuration of additional radio resources has failed or the connection with the second base station 803 has failed, indicates expiration of the timer for limiting the time for configuration of additional radio resources of the UE. In addition, according to another embodiment of the present disclosure, the method may further include storing, in a radio link failure report or a failure report of the additional radio resource configuration of a second base station, at least one of, second base station identification information associated with a failure, cell identification information, and frequency information associated with the second base station when the additional radio resource configuration through the second base station has failed or when the random access of the second base station has failed.

The second signal may include the information on failure of the additional radio resource configuration of the UE 801, and the information may be transmitted through the high layer signaling. For example, the second signal may be included in the RRC connection reconfiguration complete message or may be included in RRC connection re-establishment message. As another example, the second signal may be transmitted after being included in a new RRC message (for example, the RRC connection reconfiguration failure message or an RRC connection reconfiguration restoring request message or a message including failure of random access attempts by the configuration of additional radio resources), other than the RRC connection reconfiguration complete message or an RRC connection re-establish message.

The UE 801 may perform communication by resuming configuration of first radio resources of the first base station 802 prior to receiving the first signal in step S860. The step S860 may be performed after the step S850 of transmitting the second signal and before the step S850. The step 860 may be performed after the step S850 which transmits a second signal and before the step S850. The configuration of the radio resource of the first base station prior to receiving the first signal may include a data radio bearer through the first base station prior to receiving the first signal. In order to perform communication by resuming the radio resource configuration with the first base station 802 when the additional radio resource configuration completion has failed, the UE 801 may temporarily store the radio resource configuration of the first base station prior to receiving the first signal when running a procedure configuring the additional radio resource of the base station 2.

When the step S860 is performed after the step S850, the UE may further include a step of receiving an RRC connection reconfiguration message including the radio resource configuration with the first base station 802 prior to receiving the first signal.

On the other hand, even when the step S860 is performed after the step S850, the operation of the UE and the base station does not further include a step of receiving an RRC connection reconfiguration message including the radio resource configuration with the first base station 802 prior to receiving the first signal.

When the operation of the UE and the base station further includes the step of transmitting an RRC connection reconfiguration complete message after the step S820 of configuring additional radio resource on the basis of the received first signal, and before the step S830 of attempting a random access, and if the random access to the second base station 803 has failed in the step S840, the UE transmits the second signal to the first base station 802 in the step S850.

The second signal may include additional radio resource configuration failure indication information (or random access failure indication information for the additional radio resource configuration) of the UE 801, and the second signal may be transmitted through upper layer signaling or MAC signaling. For example, the second signal may be included in the RRC connection reconfiguration complete message or the RRC connection re-establishment message.

As another example, the second signal may be transmitted by being included in a new message (for example, the RRC connection reconfiguration failure message, or an RRC connection reconfiguration restoring request message or a message including the random access attempt failure indication by the additional radio resource configuration).

As another example, for the fast recovery, the second signal may be transmitted to the first base station through the MAC signaling indicating failure in the random access attempt caused by additional radio resource configuration.

The UE 801 may perform communication by resuming the configuration of first radio resources of the first base station 802 prior to receiving the first signal in step S860. The step S860 may be performed after the step S850 of transmitting the second signal or before the step S850. When the step S860 is performed after the step S850, the UE 801 may further include at least one of steps among: stopping the data radio bearer configured in the second base station prior to transmitting a second signal; and receiving, after transmitting the second signal, the RRC connection reconfiguration message including the configuration of radio resources of the first base station 802 prior to receiving the first signal. That is, when the radio resource configuration has failed, or when the connection with the second base station 803 has failed, for example, if the timer for limiting the configuration of additional radio resources of the UE expires before the configuration of additional radio resources through the second base station is successfully completed, the UE 801 may stop the transmission of the data radio bearer configured in the second base station and transmit the second signal. Then, the UE may receive the RRC connection reconfiguration message including the configuration of radio resources of the first base station 802 before receiving a signal to resume the data radio bearer configured in the second base station as the configuration of radio resources through the first base station. On the other hand, even when it is performed after step S850, if the UE temporarily stores the configuration of radio resources of the first base station prior to receiving the first signal during the execution of the procedure configuring the additional radio resource of the second base station, the operation of the UE and the base station may not include the steps of: stopping the data radio bearer configured in the second base station prior to transmitting the second signal; and receiving, after transmitting the second signal, the RRC connection reconfiguration message including the configuration of radio resources of the first base station 802 prior to receiving the first signal. The first base station 802 receives the second signal including information on failure of the additional radio resource configuration from the UE 801, and transmits an additional radio resource configuration cancellation message of the second base station in step S870.

Upon the receipt of an additional radio resource configuration cancellation message from the first base station 802, the second base station 803 may terminate an additional radio resource configuration procedure for the dual connectivity with the UE 801.

In the above, the operation of the UE and the base station when the configuration of additional radio resources of the second base station according to the present disclosure is not completed has been explained.

Hereinafter, detailed embodiments associated with the first and second signals in each step will be described with reference to the drawings.

The first base station transmits, to the UE, a signal including information for additional radio resource configuration through the second base station. Such a step of transmitting the first signal to the UE by the base station has been described with reference to FIG. 8. In addition, as one specific example of the first signal, for example, in FIG. 4, the RRC connection reconfiguration message has been described in detail in step 7.

In addition, as another embodiment of the present disclosure, the first signal may be received through the high layer signaling, and the first signal may further include information indicating the additional radio resource configuration through the second base station. The information indicating the additional radio resource configuration is information indicating that the corresponding signal is the message for the additional radio resource configuration through the second base station.

That is, the first signal or the RRC connection reconfiguration message which is described as an embodiment may include information on the additional radio resource configuration through the second base station and information indicating the additional radio resource configuration.

The UE may recognize that the corresponding message is the signal which enables the additional radio resource configuration of the second base station based on information indicating the additional radio resource configuration.

In accordance with embodiments of the present disclosure, information indicating additional radio resources will be described in detail with reference to FIG. 9 to FIG. 14.

As described, the additional radio resource indication information is information for indicating that the first signal or the above mentioned 7) is for the additional radio resource configuration of the second base station. Such additional radio resource indication information may be configured in accordance with the following detail embodiments.

First Detailed Embodiment: A Method Including a Field for Indicating the Configuration of Additional Radio Resources on MobilityControlInfo FIG. 9 is a diagram showing exemplary information that indicates additional radio resource configuration, which can be included in the first signal according to still another embodiment of the present disclosure.

The UE may transmit the first signal to the first base station. Such a first signal may include information that indicates the configuration of additional radio resources indicating the message for the configuration of additional radio resources of the second base station.

The first signal may be transmitted through high layer signaling. For example, the first signal may be an RRC connection reconfiguration message.

The first signal is generated by the first base station, or the first signal generated by the second base station, so as to be transmitted through the first base station.

Referring to FIG. 9A and FIG. 9B, the first signal may include a new field in a MobilityControlInfo information element in order to indicate the message for the additional radio resource configuration of the second base station.

As shown in FIG. 9A, a SeNBradioResourceconfig field is further included in the MobilityControlInfo information element and the value is set to true in order to indicate that the message is for the configuration of additional radio resources. An indication information field for indicating the additional radio resource configuration of the second base station or the secondary cell group is added to the MobilityControlInfo information element, so as to distinguish the MobilityControlInfo information element including the field from the typical MobilityControlInfo information element used for handover.

That is, the MobiilityControlInfo information element including the SeNBradioResourceconfig field provides information on whether the first signal (for example, RRC connection reconfiguration message) received at the UE is the signal for additionally configuring the second base station radio resource. The MobilityControlInfo information element for indicating the additional radio resources of the second base station may include the timer information described above and random access configuration information (RACH-ConfigDedicated).

In addition, the MobilityControlInfo information element may be configured as shown in FIG. 9B. That is, it is possible to use a different name to distinguish that from the existing MobilityControlInfo information element used for handover. For example, in order to indicate additional radio resource configuration of the second base station, the second base station MobilityControlInfo information element or secondary cell group MobilityControlInfo information element distinguished from the typical MobilityControlInfo information element can be defined. The second base station MobilityControlInfo information element or the secondary cell group information element for indicating the configuration of additional radio resources of the second base station may include the aforementioned timer information and random access (RACH-ConfigDedicated) configuration information.

In addition, the MobilityControlInfo information element may additionally configure various fields, and the MobilityControlInfo information element may be configured by combining each field of FIG. 9A and FIG. 9B.

Second Detailed Embodiment: A Method for Including a Field for Indicating Additional Radio Resource Configuration on SCellToAddMod FIG. 10 is a diagram showing another exemplary information that indicates additional radio resource configuration, which can be included in the first signal according to still another embodiment of the present disclosure.

Referring to FIG. 10, the first signal may include a new field in the SCell information element in order to indicate that the first signal is the message for the additional radio resource configuration of the second base station.

For example, a SeNBradioResourceconfig field and an ARRC timer field can be added to a SCellToAddMod-r10 information element for indication.

The SeNBradioResourceconfig field may include information for indicating whether the first signal is the message for the additional radio resource configuration of the second base station. For example, the indication information may be information indicating that a cell having a particular cell index sCellIndex included in the SCellToAddMod-r12 information element is a cell associated with the second base station.

In another method, by defining a new sCellIndex-12 field that does not include the SeNBradioResourceconfig field and distinguished from the sCellIndex-10, it can be distinguished whether a cell having a particular cell index sCellIndex included in SCellToAddMod-r12 information element is a cell associated with the first base station or associated with the second base station.

The ARRC timer field includes timer information for the additional radio resource configuration of the UE. The ARRC timer may start when the UE receives the first signal (for example, RRC connection reconfiguration message) including information for the additional radio resource configuration through the second base station. The ARRC timer may stop when the additional radio resource configuration of the UE is successfully completed. The ARRC timer is referred to for the convenience of explanation of the timer for the configuration of additional radio resources through the second base station. However, embodiments of the present disclosure are not limited thereto.

Specific examples for the successful completion of the additional radio resource configuration of the UE correspond to a case where the MAC successfully performs the uplink synchronization, a case where the random access process is successfully completed, and a case where RRC connection reconfiguration complete message is transmitted and the like.

As described above with reference to FIG. 8, if the ARRC timer expires before the successful completion of the additional radio resource configuration of the UE, the UE may return to an original radio resource configuration used in the first base station.

In addition, the UE may store information on failure of the additional radio resource configuration on the VarRLF-Report. The ARRC timer, for example, may be a T304 timer or a new timer distinguished from the T304 timer. The ARRC timer for the configuration of additional radio resources may not be included in SCellToAddMod information or may be included in other information elements.

The UE may stop transmission of a data radio bearer configured in the second base station and transmit the second signal in order to return to the existing configuration of additional radio resources originally used in the first base station. In addition, the UE may receive the RRC connection reconfiguration message including the configuration of radio resources of the first base station 802 before receiving the first signal.

That is, in accordance with still another embodiment of the present disclosure, when there is failure in the configuration of additional radio resources through the second base station or in the random access with the second base station, operations of the UE and the base stations may further include the step of storing at least one of second base station identification information associated with the failure, cell identification information associated with the second base station, and frequency information in the radio link failure report or the second base station additional radio resource configuration failure report.

In another method, the UE may represent an additional radio resource configuration through the second base station by including DRB add/modify information DRB-ToAddMod in SCell add/modify information sCellToAddMod-r12, instead of information indicating the configuration of additional radio resources SeNBradioResourceconfig for indicating information on the additional radio resource configuration through the second base station.

Third Detail Embodiment: A Method for Including New Information Element for Indicating the Additional Radio Resource Configuration A first signal (for example, RRC connection reconfiguration message) transmitted to the UE by the first base station may include a new information element distinguished from the existing information element in order to indicate that the first signal is the message for the additional radio resource configuration of the second base station.

The first signal or the information included in the first signal as described above may be generated by the first base station. Or, the first signal or the information included in the first signal may be generated by the second base station and transmitted to the UE through the first base station.

Some embodiments for the new information element distinguished from the existing information element will be described with reference to FIG. 11 to FIG. 13.

FIG. 11 is a diagram showing still another exemplary information that indicates additional radio resource configuration, which can be included in the first signal according to still another embodiment of the present disclosure.

Referring to FIG. 11, a SeNBradioResourceConfig information element may include physical cell identifier information, carrier frequency information, and carrier frequency band information of a target base station (e.g., second base station).

Another example of the above-mentioned new information element configuration is shown in FIG. 12.

FIG. 12 is a diagram showing another exemplary information that indicates additional radio resource configuration, which can be included in the first signal according to still another embodiment of the present disclosure.

Referring to FIG. 12, a SeNBIndex field may include a second base station ID or index information for additional radio resource configuration. On the other hand, the SeNBIndex field includes a SeNBScellIndex field, and the SeNBScellindex field may include cell ID information or cell index information of the cell associated with the second base station for additional radio resource configuration. For example, the SeNBScellIndex information may be information indicating that the cell having a particular second base station cell index SeNBScellIndex is a cell associated with the second base station. The second base station cell index SeNBScellIndex will be a value distinguished from ScellIndex prior to the release-11 for distinguishing cells associated with the first base station. In another method, by defining a new sCellIndex-12 field that does not include the SeNBIndex field or the SeNBScellIndex field and is distinguished from the sCellIndex-10, it can be distinguished whether a cell having a particular cell index sCellIndex included in the SCellToAddMod-r12 information element is a cell associated with the first base station or associated with the second base station.

On the other hand, the RACH-ConfigDedicated information element may include information for displaying the configuration of additional radio resources.

The ARRC timer for the configuration of additional radio resources may not be included in the SCellToAddMod information or may be included in other information elements.

FIG. 13 is a diagram showing still another exemplary information indicating additional radio resource configuration, which can be included in the first signal according to still another embodiment of the present disclosure.

Referring to FIG. 13, the first signal may include information for the configuration of additional radio resources for some cells among a plurality of cells associated with the second base station.

For example, it is possible to transfer radio resource configuration information associated with the cell of the second base station to add by including the radioResourceConfigCommonSCell field.

The UE may receive the first signal including the new information element described above, perform a random access process of the second base station, and then acquire system information.

In another method, the UE may not acquire broadcasted system information by receiving, through an RRC message, system information (radioResourceConfigCommonSCell-r10) included in common radio resource configuration (radioResourceConfigCommon).

Fourth Detailed Embodiment: A Method Including a New Field for Indicating Additional Radio Resource Configuration in the Radio Resource Configuration Dedicated (radioResourceConfigDedicated) Information Element FIG. 14 is a diagram showing still another exemplary information that indicates additional radio resource configuration, which can be included in a first signal according to still another embodiment of the present disclosure.

Referring to FIG. 14, a first signal (for example, RRC Connection Reconfiguration message) transmitted to the UE by the first base station may include a new field in the radio resource configuration dedicated (radioResourceConfigDedicated) information element in order to indicate a message for additional radio resource configuration of the second base station.

As shown in FIG. 14, when including additional radio resource configuration of bearer configuration field in the radio bearer add/modify information of the radio resource configuration dedicated (radioResourceConfigDedicated) of the second base station, the UE may know that the first signal is the message for the additional radio resource configuration.

The SeNBIndex field may include second base station index information, ID information, identifier information, or identifier (true or false) information for the additional radio resource of the second base station. That is, if the SeNBIndex field is included, it may indicate that a data radio bearer included in the DRB-ToAddMod is a radio bearer configured through the second base station or configured by using the radio resource of the second base station.

On the other hand, if a SeNBSCellindex field is included, the SeNBSCellindex field may include index information, ID information or identifier information with respect to a cell for additionally configuring radio resources for the UE among a plurality of cells associated with the second base station.

In the above, information for indicating the additional radio resources which can be included in the first signal or the detailed embodiment for information on the configuration of additional radio resources has been described with reference to the drawings. Each of the detailed embodiments described above may contain a variety of ways, including information indicating the configuration of additional radio resources and/or information for the configuration of radio resources.

As described in the above with reference to FIG. 4 and FIG. 8, when receiving the first signal (for example, RRC connection reconfiguration message) described above, the UE may start a timer for limiting the time for the additional radio resource configuration of the UE. The timer for limiting the time for additional radio resource configuration may be a timer (in the above example, the T304 timer or ARRC timer) included in the information for additional radio resource configuration of the second base station of the first signal. In another method, the timer value is set in advance in the UE.

When the UE performs the additional radio resource configuration based on the received first signal and successfully performs the additional radio resource configuration and the random access, the timer expires and the UE performs communication by using the radio resources of the first base station and the second base station.

When the timer expires before the additional radio resource configuration through the second base station is successfully completed, the UE may determine that the additional radio resource configuration has failed and resume the radio resource configuration prior to receiving the first signal. On the other hand, the UE may perform communication using the existing radio resource of the first base station by re-establishing/reconfiguring the radio resource configuration prior to receiving the first signal.

Thus, the UE may reduce an unnecessary operation due to failure of the additional radio resource configuration and continuously communicate.

When describing in detail, for example, when the timer expires before the UE transmits the RRC connection reconfiguration complete message, a MAC entity of the UE successfully performs the uplink synchronization with the second base station, or a random access process is successfully completed with the second base station, the UE may return to the last radio resource configuration prior to receiving the first signal including the additional radio resource configuration information through the second base station.

For example, if the UE is to transmit, through the second base station, by bearer splitting or no-bearer-splitting the existing bearer configuration through the first base station, the UE progresses the transmission process based on the information for additional radio resource configuration. If the procedure to transmit through the second base station has failed, the UE may reconfigure each of the corresponding radio bearers to the previous radio bearer configuration configured through the first base station.

In addition, the additional radio resource configuration failure information may be stored in a VarRLF-Report or a new information element for the additional radio resource configuration failure report of the second base station. On the other hand, the UE may transmit a second signal including information for displaying the additional radio resource configuration failure of the second base station to the first base station.

An example of the additional radio resource configuration failure information included in the above-described VarRLF-Report or the new information element for the second base station additional radio resource configuration failure report is as follows.

FIG. 15 is a diagram showing exemplary information on failure in additional radio resource configuration according to still another embodiment of the present disclosure.

Referring to FIG. 15, the VarRLF-Report or the new information element for the second base station additional radio resource configuration failure report may provide information on a second base station which has failed the additional radio resource configuration, a second base station which has failed the additional radio resource configuration additional radio resource configuration through a field (failedSeNBId or failedSCellId) for identifying the second base station, or a cell (SCell) associated with the second base station When the second base station, or the field (failedSeNBId or failedSCellId) for identifying the second base station is available, the second base station which has failed the configuration of additional radio resources, a secondary cell (SCell) of the second base station, a cell associated with the second base station, a global cell identifier of a representative cell of the second base station, otherwise, a physical cell identifier and a carrier frequency are set.

In another method, a field (failed the second base station Id or failedSCellId) for identifying the second base station or the SCell of the second base station may include a second base station identifier which has failed the additional radio resource configuration or an SCell identifier of the second base station.

The VarRLF-Report or the new information element for the second base station additional radio resource configuration failure report may provide altogether a first base station PCell which has transmitted the first signal (for example, RRC connection reconfiguration message) including the second base station information on the additional radio resource configuration and a field (previousPCellId or previousMeNBId) for identifying the first base station, prior to configuring the additional radio resource.

The PCell or the field (previousPCellId or previousMeNBId) identifying the first base station sets the PCell, the first base station, the first base station cell, or the global cell identifier of the representative cell of the first base station.

In another method, the PCell or the field (previousPCellId or previousMeNBId) for identifying the first base station may include a first base station identifier.

The VarRLF-Report or the new information element for the second base station additional radio resource configuration failure report may set the time elapsed after receiving the last first signal (for example, RRC connection reconfiguration message) including information on the additional radio resource configuration through a timeConnFailure field.

The VarRLF-Report or the new information element for the second base station additional radio resource configuration failure report may set an additional radio resource configuration failure type or a cause value through a connectionFailureType field.

In the above, the operation between the UE and the base station was described according to each embodiment of the present disclosure. Hereinafter, each operation of the UE and the base station according to the present disclosure will be described with reference to the drawings.

Figure 16:
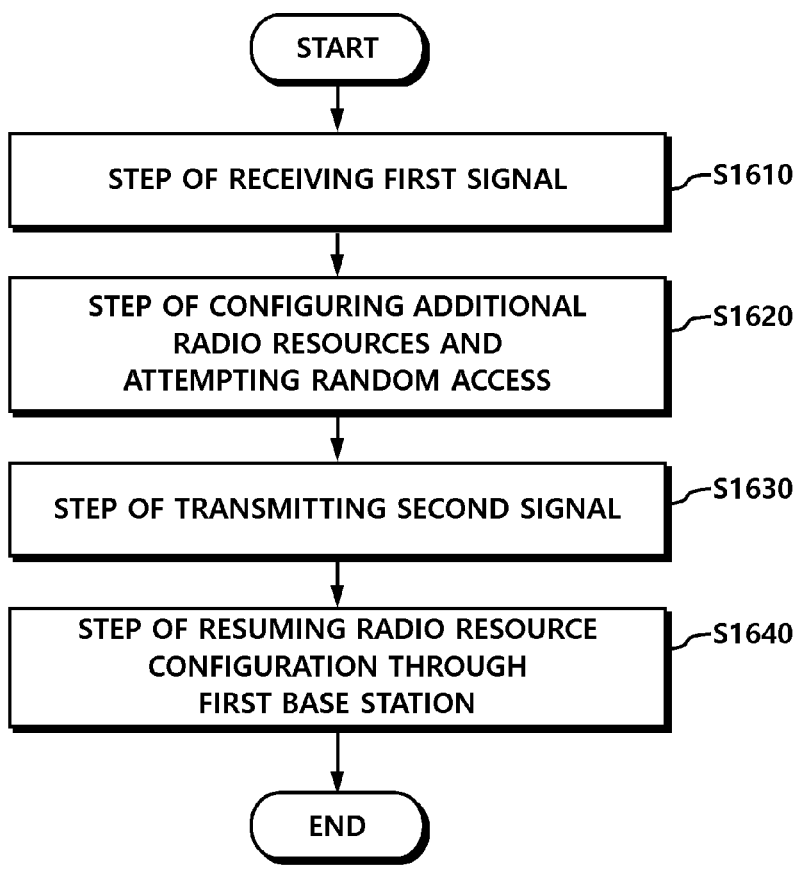
FIG. 16 is a flowchart illustrating an exemplary operation of a UE according to an embodiment of the present disclosure.

FIG. 16 is a flow chart illustrating operation of a UE according to still another embodiment of the present disclosure.

According to another embodiment of the present disclosure, a method for configuring a dual connection with multiple base stations by a UE will be described. The method includes: receiving, from a first base station, a first signal including information for indicating additional radio resource configuration through a second base station; attempting the additional radio resource configuration through the second base station based on the first signal and random access to the second base station; and when the additional radio resource configuration through the second base station or the random access to the second base station has failed, transmitting, to the first base station, a second signal including information on failure in the additional radio resource configuration.

Referring to FIG. 16, the UE receives, from the first base station, a first signal including information for the additional radio resource configuration through the second base station in step S1610. As described above, the first signal may be transmitted through the high layer signaling and may include information indicating the additional radio resource configuration.

The UE performs a procedure for the additional radio resource configuration through the second base station based on the first signal and attempts random access to the second base station in step S1620.

When the timer for restricting a time of the radio resource configuration expires before the successful completion of the additional radio resource configuration through the second base station, the UE transmits a second signal including information indicating failure of the additional radio resource configuration of the first base station in step S1630.

If the timer for restricting the time of the radio resource configuration expires before the successful completion of the additional radio resource configuration through the second base station, and when the VarRLF-Report or a new information element for the second base station additional radio resource configuration failure report has been set, the UE transmits the second signal to the first base station S1630.

Then, in order to return to the configuration of radio resources of the first base station prior to receiving the first signal, the UE performs corresponding operation and resumes the configuration of radio resources through the first base station in step S1640. As described above, the meaning of resuming the configuration of radio resources through the first base station is cancelling the bearer configuration, etc. for the second base station additional radio resource configuration and returning to the radio bearer configuration through the first base station prior to receiving the first signal.

Figure 17:
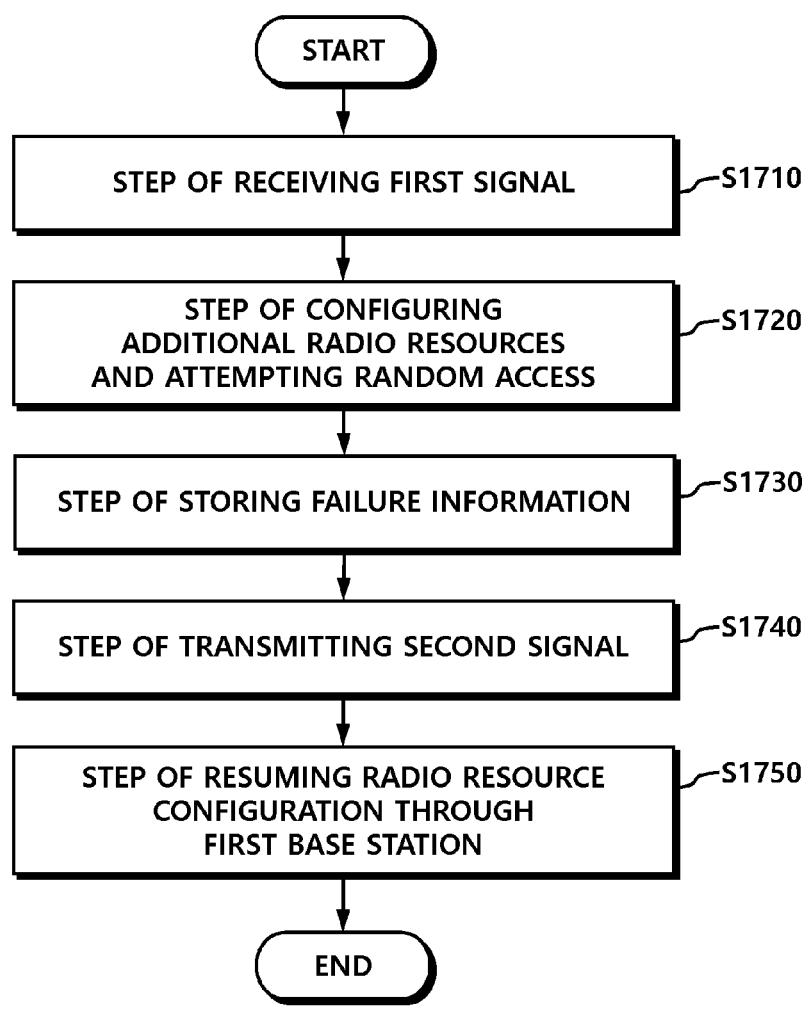
FIG. 17 is a flowchart illustrating another exemplary operation of a UE according to another embodiment of the present disclosure.

FIG. 17 is a flowchart illustrating operation of the UE according to still another embodiment of the present disclosure.

FIG. 17 is a flowchart illustrating operation of the UE including storing information related to failure when the UE described above with reference to FIG. 15 fails in the additional radio resource configuration through the second base station.

Referring to FIG. 17, the UE receives, from the first base station, the first signal including information for additional radio resource configuration and/or information indicating the additional radio resource configuration of the second base station in step S1710.

The UE performs the additional radio resource configuration through the second base station based on the first signal and performs a random access procedure with the second base station. As described above, the additional radio resource configuration and the random access procedure may be performed at the same time, or any one may be preferred over the other.

The UE may start a timer for the additional radio resource configuration while performing the additional radio resource configuration. If the timer expires before the additional radio resource configuration through the second base station is successfully completed, the UE may store the failure related information in the VarRLF-Report or new information element for a failure report for the configuration of additional radio resources of the second base station as described in FIG. 15.

For example, when the timer expires before the UE transmits the additional radio resource configuration complete message (e.g., the RRC connection reconfiguration complete message), the MAC successfully performs the uplink synchronization with the second base station, or a random access process is successfully completed with the second base station, and the UE determines that the additional radio resource configuration has failed.

When the additional radio resource configuration has failed, the UE includes the VarRLF-Report or the new information element for the additional radio resource configuration failure report of the second base station or information indicating the failure of the configuration of radio resources of the second base station in a second signal (for example, RRC Connection reconfiguration complete message) and then transmits the second signal to the first base station in step S1740.

That is, the UE may transmit the second signal to the first base station when the timer for restricting the time for configuring radio resources of the UE expires and the VarRLF-Report or the new information element for the failure report of additional radio resource configuration of the second base station have been set.

The UE may reconfigure/re-establish the radio resource configuration through the first base station before the first signal is received in step S1750. That is, when the timer of the UE expires before the radio resource configuration is successfully completed through the second base station, the UE may transmit an indication that information on a failure of the configuration of additional radio resources is available or a failure indication to the second signal so as to allow the first base station to return to the configuration of the radio resources used by the first base station in the past.

The indication that the information on a failure of the configuration of additional radio resources of the second base station is available, which can be included in the second signal (for example, RRC connection reconfiguration complete message), may use the existing RLF-InfoAvailable field (for example, ENUMERATED {true}). On the other hand, the indication may use an extended existing rlf-InfoAvailable field (ENUMERATED {cause1, cause2}). On the other hand, a new field can be defined and used to indicate that information on failure in the additional radio resource configuration is available. As an example of the new field indicating that the failure information of the additional radio resource configuration is available, arrcf-InfoAvailable: additional radio resource configuration failure-infoAvailable (true) can be defined.

According to still another embodiment of the present disclosure, a second signal may include the additional radio resource configuration failure indication information, information for requesting for the restoration of RRC connection reconfiguration, the information indicating failure of random access by the configuration of radio resources, in the additional radio resource connection reconfiguration failure message, the RRC connection reconfiguration restore request message, or the message including random access attempt failure indication by the configuration of additional radio resources, which are distinguished from the radio resource connection reconfiguration complete message and the radio resource connection re-establishment message.

Specifically, for example, the UE may transmit, to the first base station, the VarRLF-Report, the new information element for additional radio resource configuration failure report of the second base station, an indication that the information on a failure of the configuration of additional radio resources of the second base station display is available, and/or the failure indication information for the configuration of radio resources of the second base station, through a different RRC message other than the RRC connection reconfiguration complete message.

For example, the other RRC message may be an RRC Connection Setup Complete message, UEInformationResponse, or ULInformationTransfer RRC, or RRC Connection Re-establishment Complete message or a new RRC message.

As described above, the typical RRC connection reconfiguration procedure considers that the reconfiguration has failed when the UE does not comply with any one of the configurations included in the RRC connection reconfiguration message received from the base station, and when the security is not activated, the typical procedure may perform an operation of leaving the RRC connection. If the security is activated, the procedure has to initiate the RRC connection re-establishment procedure.

However, while performing normal data communication through the first base station by the UE, when the additional radio resource configuration of the second base station has failed due to the connection failure to the second base station (for example, the problem of random access on the second base station, the failure of performing synchronization for a down link of a serving cell of the second base station when configuring the additional radio resources, or N310 consecutive out-of-sync indications at the physical layer of a serving cell of the second base station), it may be inefficient to handle an RRC connection reconfiguration failure as the conventional method.

That is, since the UE may perform normal data communication through the first base station even when the additional radio resource configuration through the second base station has failed, an operation of establishing the RRC connection again after transiting to an RRC idle state may be unnecessary. Further, in order to perform the RRC connection re-establishment according to the failure of the additional radio resource configuration through the second base station, it may be inefficient that the UE stops all radio bearers other than Signaling Radio bearer 0 (SRB0), releases the SCell, selects the cell again, and then resumes Signaling Radio bearer 1 (SRB1) and reconfigures the Data Radio bearer (DRB) according to the RRC connection reconfiguration procedure.

Therefore, the UE according to the present disclosure includes, in the second signal, failure indication information (or an RRC connection reconfiguration restoration request information (or information indicating failure of random access by the configuration of additional radio resources) for the additional radio resource configuration of the second base station, or the UE may define a new failure message for reporting the failure in additional radio resource configuration of the second base station.

Further, the second signal according to the present disclosure may include information indicating failure of the additional radio resource configuration, information for requesting for the restoration of RRC connection reconfiguration, the information indicating failure of random access caused by the configuration of radio resources, in the additional radio resource connection reconfiguration failure message, the RRC connection reconfiguration restore request message, or the message including random access attempt failure indication by the additional radio resource configuration, which are distinguished from the radio resource connection reconfiguration complete message and the radio resource connection re-establishment message.

In addition, the second signal according to the present disclosure may be provided by the MAC signaling indicating the failure in the additional radio resource configuration (or an RRC connection reconfiguration restoration request or random access attempt failure by the configuration of additional radio resources) for a quick processing.

For example, when transmitting a new RRC failure message (for example, the radio resource connection reconfiguration failure message, the RRC connection reconfiguration restoration request message, or the random access attempt failure message by the configuration of additional radio resources) for the additional radio resource configuration of the second base station, the UE may maintain the existing serving cell(s) of the first base station.

As another example, the UE may maintain the existing serving cell(s) of the first base station, even when running the RRC connection procedure due to the failure of the additional radio resource configuration of the second base station. In addition, the UE may include the additional radio resources configuration failure indication of the second base station in reestablishmentCause information of the RRC connection re-establish request message.

When the first base station receives the second signal including at least one piece of information among the VarRLF-Report, the new information element for the failure report of the configuration of additional radio resources of the second base station, an indication that the additional radio resources configuration failure information of the second additional base station is available, or the failure indication information for the configuration of additional radio resources of the second base station, the first base station may release the preparation for the additional radio resource configuration of the second base station which is in progress at the first base station. In addition, the first base station may transmit, to the second base station, a message (offload cancellation message) for cancelling the preparation of the configuration of additional radio resources in progress In the above, referring to FIG. 17 and FIG. 18, when the UE according to the present disclosure performs a procedure for configuring additional radio resources of the second base station, the operations of the UE have been described in detail according to each embodiment in the case where the failure of the configuration of radio resources occurs.

Hereinafter, when the UE of the present disclosure succeeds in the additional radio resource configuration of the second base station, the operation of the UE will be described in detail according to detailed embodiments.

The UE may succeed in the additional radio resource configuration and the random access with the second base station based on the first signal. In this case, the UE may transmit the information on the success of the additional radio resource configuration to the first base station or the second base station.

First Detailed Embodiment: A Method for Transmitting a RRC Connection Reconfiguration Complete Message to the First Base Station The UE may transmit the RRC connection reconfiguration complete message to the first base station.

For example, when the Signaling Radio bearer (SRB) which transmits the RRC message is configured on the first base station and the second base station through the bearer split additional radio resource configuration of FIG. 5, the UE may transmit the RRC connection reconfiguration complete message without distinguishing the upper transmission channel of the first base station and the upper transmission channel of the second base station.

As another example, when the Signaling Radio bearer (SRB) is configured to transmit the RRC message only through the first base station as shown in FIG. 6, the UE transmits the RRC connection reconfiguration complete message to the upper transmission channel of the first base station.

As another example, when the Signaling Radio bearer (SRB) is configured to transmit the RRC message only through the first base station as shown in FIG. 7, the UE transmits the RRC connection reconfiguration complete message to the upper transmission channel of the first base station in which the SRB is established.

The first base station may receive the RRC connection reconfiguration complete message and may forward the message to the second base station. On the other hand, the first base station may receive the RRC connection reconfiguration complete message and may transmit the success message for the configuration of additional radio resources to the second base station.

As another method, when the Signaling Radio bearer (SRB) is configured on the first base station and the second base station through the bearer split additional radio resource configuration, as shown in FIG. 5, and the RRC connection reconfiguration complete message is transmitted through the second base station transmission channel of the UE, the second base station may check the RRC connection reconfiguration complete message forwarded to the first base station.

In another method, the second base station may check the success of the additional radio resource configuration through the random access procedure and the like.

Second Detailed Embodiment: A Method for Transmitting the RRC Connection Reconfiguration Complete Message to the Second Base Station The UE may transmit the RRC connection reconfiguration complete message to the second base station.

For example, when the Signaling Radio bearer (SRB) which transmits the RRC message is configured on the first base station and the second base station through the bearer split additional radio resource configuration, as shown in FIG. 5, the UE may transmit the RRC connection reconfiguration complete message through the upper transmission channel of the second base station.

In another example, even when the Signaling Radio bearer (SRB) is configured to transmit only through the first base station as shown in FIG. 6, the UE transmits the RRC connection reconfiguration complete message through an uplink logical channel of the second base station.

In another example, even when the Signaling Radio bearer (SRB) is configured to transmit the RRC message only through the first base station as shown in FIG. 7, the UE may transmit the RRC connection reconfiguration complete message through an upper transmission channel of the second base station.

The second base station may receive the RRC connection reconfiguration complete message and may forward the received message to the first base station.

Third Detailed Embodiment: A Method for Individually Transmitting the RRC Connection Reconfiguration Complete Message to the First RRC Base Station and the Second Base Station The UE may transmit the RRC connection reconfiguration complete message to the first base station and the second base station.

To this end, the above-described first signal (for example, RRC connection reconfiguration message) may include information that the UE may individually transmit the RRC connection reconfiguration complete message to the first base station and the second base station.

When the first signal (for example, RRC connection reconfiguration message) includes the information that the UE transmits the RRC connection reconfiguration complete message to the first base station and the second base station or information of indicating the additional radio resource configuration to the second base station, the UE may transmit the RRC connection reconfiguration complete message through upper transmission channel of the first base station and the upper transmission channel of the second base station.

The first base station or second base station may forward the received RRC connection reconfiguration complete message to the second base station or the first base station.

Hereinafter, when the additional radio resource configuration according to the present disclosure has failed, an operation of the base station will be described with reference to the drawings.

Figure 18:
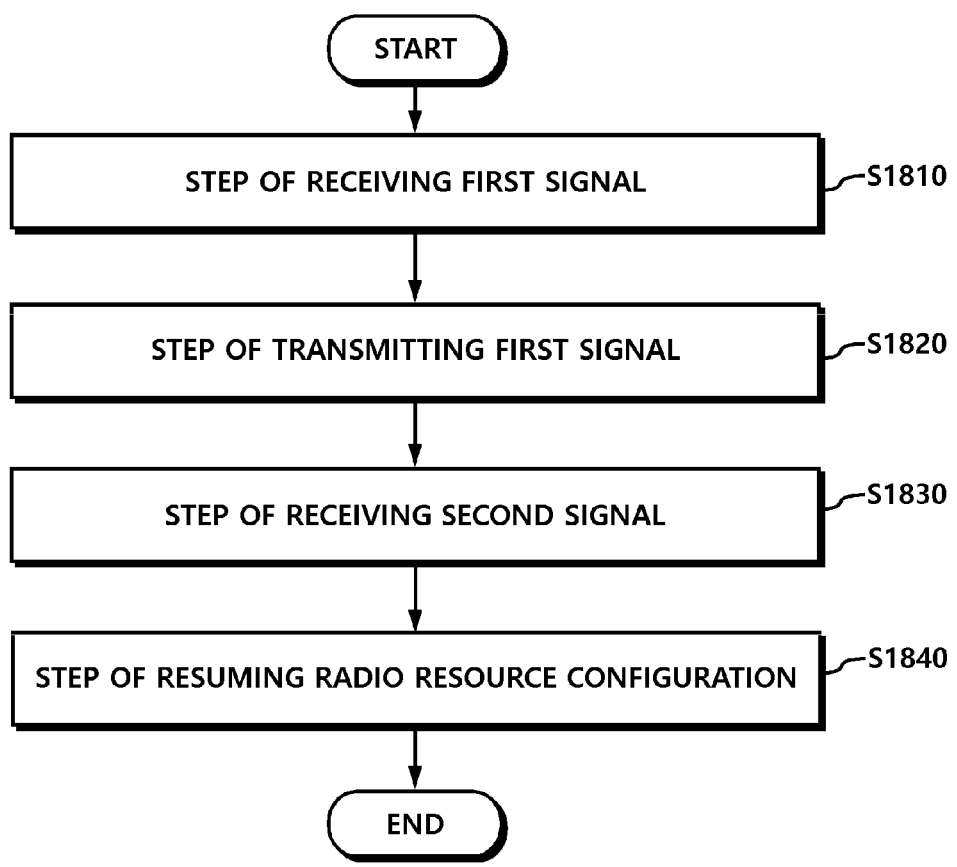
FIG. 18 is a flowchart illustrating an exemplary operation of a base station according to an embodiment of the present disclosure.

FIG. 18 is a flow diagram illustrating an operation of a base station according to still another embodiment of the present disclosure.

According to the present disclosure, a method may be provided for controlling a dual connectivity configuration of a UE by a first base station. The method may include receiving a first signal including information for indicating additional radio resource configuration through a second base station; transmitting the first signal through high layer signaling; and receiving a second signal including information indicating failure of the additional radio resource configuration from the UE.

Referring to FIG. 18, a base station (e.g., first base station) according to still another embodiment of the present disclosure receives the first signal including the information required to configure additional radio resources of the second base station by the UE in step S1810. The first signal as described above is transmitted through the high layer signaling, and the first signal may further include the additional radio resource configuration indication information through the second base station. Specific detailed embodiments of the additional radio resource configuration indication information are described in detail with reference to FIG. 9 to FIG. 14.

The first base station transmits the generated first signal to the UE through the high layer signaling in step S1820.

The UE performs the additional radio resource configuration through the second base station based on the first signal, and the UE performs the random access procedure with the second base station. When the UE has successfully completed the additional radio resource configuration through the second base station and the random access procedure with the second base station, the first base station may receive a message including the additional radio resource configuration complete information from the UE. Detailed various embodiments of receiving the additional radio resource configuration complete information by the first base station are equal to those described above.

However, when the UE fails in the additional radio resource configuration such as not completing the additional radio resource configuration or not completing the random access procedure with the second base station, the first base station may receive a second signal from the UE in step S1830.

The second signal may include the additional radio resource configuration failure indication information (or the RRC connection reconfiguration restoration request message or a new message including information indicating failure of random access by the configuration of additional radio resources) in the radio resource connection reconfiguration failure indication information (or the RRC connection reconfiguration restoration request information or the information indicating failure of random access attempt by the configuration of additional radio resources) distinguished from the additional radio resource connection reconfiguration complete message and the radio resource connection re-establishment message. On the other hand, the second signal may be transmitted through the MAC signaling indicating the failure of the configuration of additional radio resources of the UE (or failure on the random access for the configuration of additional radio resources).

The first base station may resume the additional radio resource configuration with the UE prior to transmitting the first signal after receiving the second signal in step S1840.

For example, the first base station has transmitted the first signal for establishing a radio bearer using the radio resources of the second base station as shown in FIG. 5 to FIG. 7, however, when the UE fails in the additional radio resource configuration, the first base station may resume the configuration prior to the configuration of radio bearers using the radio resources of the second base station so as to communicate with the UE. To this end, the first base station may transmit, to the UE, the RRC connection reconfiguration message including the configuration information prior to the configuration of radio bearers using the radio resources of the second base station.

Figure 19:
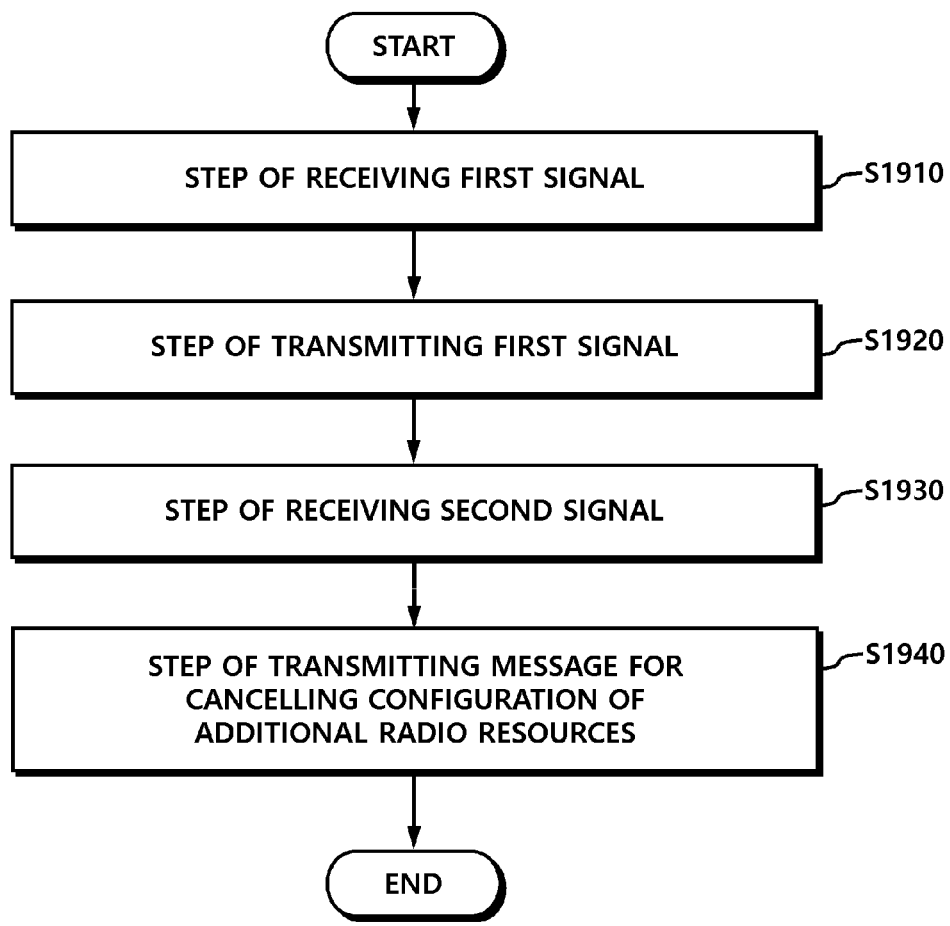
FIG. 19 is another flowchart illustrating an exemplary operation of a base station according to another embodiment of the present disclosure.

FIG. 19 is a flowchart illustrating operation of a base station according to further still another embodiment of the present disclosure.

According to still another embodiment of the present disclosure, a base station (e.g., first base station) may further include transmitting, to the second base station, a message for cancelling additional radio resource configuration after receiving a second signal.

Referring to FIG. 19, the first base station generates a first signal that includes information on the additional radio resource configuration using the radio resources of the second base station in step S1910.

The first signal may further include information indicating the additional radio resource configuration as described with reference to FIG. 18, the first signal may be transmitted to the UE through the high layer signaling in step S1920.

When the UE fails in the additional radio resource configuration based on the first signal, the first base station receives the second signal from the UE in step S1930. The second signal may include additional radio resource configuration failure indication information, and the second signal may be received through the high layer signaling.

In addition, the second signal may include the additional radio resource configuration failure indication information in the radio resource connection reconfiguration failure message (or the RRC connection reconfiguration restoration request message or a new message including information indicating failure of random access by the configuration of additional radio resources) distinguished from the additional radio resource connection reconfiguration complete message and the radio resource connection re-establishment message. That is, the second signal may be a newly defined radio resource connection reconfiguration failure message different from the existing message, or the second signal may include the corresponding message. On the other hand, the second signal may be transmitted through the MAC signaling for indicating failure of the configuration of additional radio resources of the UE (or random access failure for configuring the additional radio resources).

The first base station may transmit, to the second base station, a message for cancelling the additional radio resource configuration after receiving the second signal in step S1940. Further, the first base station may resume the configuration of radio resources with the UE before transmitting the first signal. Step S1940 and the step of resuming the configuration of existing radio resources may be performed at the same time, or either one of the steps may be preferentially performed over the other step.

The second base station which has received, from the first base station, the message including the information for cancelling the additional radio resource configuration, cancels all the procedures for the additional radio resource configuration with the UE.

As described above, even when the additional radio resource configuration fails due to the radio link failure in the process of configuring the additional radio resources that can be provided by the second base station in order to use the radio resources provided by one or more different base stations connected through a non-ideal backhaul, the UE and the first base station have the effect capable of resuming the existing radio resource configuration and continuing the communication. Thus, the UE has the effect of bypassing the steps of SRB release and SCell release other than unnecessary steps of RRC connection re-establishment or SRB0.

Configuration of the UE and the base station capable of performing all the respective embodiments of the present disclosure described with reference to FIG. 1 to FIG. 19 will be described with reference to the drawings.

Figure 20:
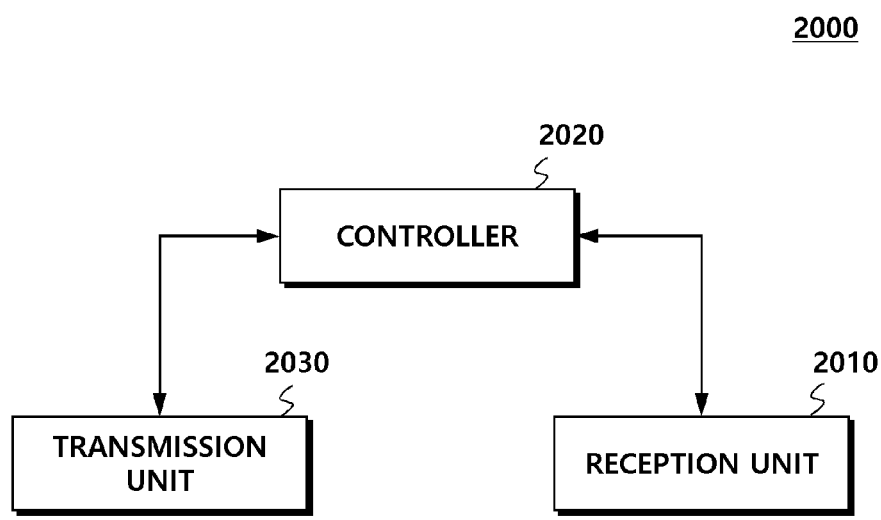
FIG. 20 is a diagram showing a configuration of a UE according to an embodiment of the present disclosure.

FIG. 20 illustrates a UE according to an embodiment of the present disclosure.

Referring to FIG. 20, the UE 2000 according to an embodiment of the present disclosure includes a reception unit 2010, a controller 2020, and transmission unit 2030.

According to an embodiment of the present disclosure, the UE 2000 configures dual connectivity with the plurality of base stations. The UE 200 may include a reception unit 2010 configured to receive, from a first base station, a first signal including information that indicates additional radio resource configuration through a second base station; a controller 2020 configured to attempt the additional radio resource configuration through a second base station based on the first signal and a random access with the second base station; and a transmission unit 2030 configured to transmit, when failing in the additional radio resource configuration through the second base station and a random access with the second base station, to the first base station, a second signal including information indicating failure of the additional radio resource configuration.

The controller 2020 may control to resume the existing radio resource configuration through the first base station prior to receiving the first signal when failing in the additional radio resource configuration through the second base station and the random access with the second base station.

Here, the existing configuration of radio resources through the first base station includes a data radio bearer through the first base station prior to receiving the first signal, as described above.

In addition, when failing in the additional radio resource configuration through the second base station and the random access with the second base station, the controller 2020 may control to store at least one of the second base station identification information associated with the failure, cell identification information, and frequency information associated with the second base station in the radio link failure report or the failure report of the additional radio resource configuration of the second base station.

The reception unit 2010 may receive the first signal through the high layer signaling, and the first signal may further include the indication information indicating the configuration of radio resources through the second base station.

The transmission unit 2030 may transmit the second signal through the high layer signaling, and the second signal may include the additional radio resource configuration failure indication information, the RRC connection reconfiguration restoration request, the information indicating failure of random access by the configuration of additional radio resources, in the additional radio resource connection reconfiguration failure message or an RRC connection reconfiguration restoration request message, or the message including a random access attempt failure by the configuration of radio resources which are distinguished from the additional radio resource connection reconfiguration complete message or additional radio resource connection re-establishment message In addition, the reception unit 2010 receives the downlink control information, data, and messages from the base station through the corresponding channel.

The controller 2020 controls the UE required for performing the above-described present disclosure so as to configure additional radio resources, and when failing in the configuration, the controller 2020 controls the general operation of the UE according to the resumption of the radio resource configuration with the conventional first base station.

The transmission unit 2030 further transmits, to the base station, uplink control information, data, and a message through the corresponding channel.

Figure 21:
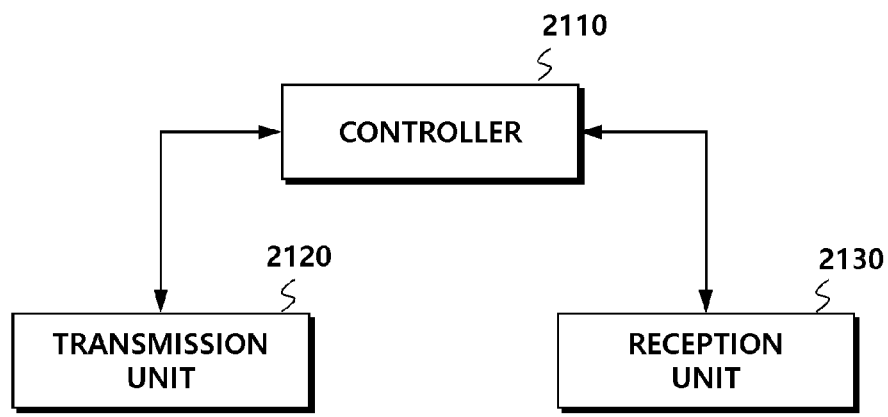
FIG. 21 is a diagram showing a configuration of a base station according to an embodiment of the present disclosure.

FIG. 21 is a diagram showing a configuration of a base station according to still another embodiment of the present disclosure.

Referring to FIG. 21, the base station 2100 according to still another embodiment of the present disclosure includes a controller 2110, a transmission unit 2120, and a reception unit 2130.

The first base station 2100 controls a dual connectivity configuration of the UE according to the present disclosure. Such a first base station 2100 may include the reception unit 2130 that receives a first signal including information for indicating the additional radio resource configuration through the second base station, and the transmission unit 2120 that transmits the first signal through the high layer signaling. The reception unit 2130 may receive a second signal including information indicating failure in the additional radio resource configuration from the UE.

The controller 2110 may control, after receiving the second signal, so as to resume the configuration of radio resources with the UE before transmitting the first signal. The configuration of radio resources with the UE before transmitting the first signal may include a Data Radio bearer (DRB) through the first base station before transmitting the first signal.

The transmission unit 2120 may transmit the first signal through the high layer signaling, and the first signal may include the indication information indicating the additional radio resource configuration through the second base station.

In addition, the transmission unit 2120 further transmits, after receiving the second signal, a message for resuming the data radio bearer through the first base station before transmitting the first signal to the UE, or further transmits a message for cancelling the configuration of additional radio resources to the second base station.

The reception unit 2130 may receive the second signal that includes information on a failure of the configuration of additional radio resources from the UE, and the second signal includes the information indicating failure of the configuration of additional radio resources (or the RRC connection reconfiguration restoration request or information indicating failure of random access attempt by additional radio resource configuration) in the additional radio resource connection reconfiguration failure message (or RRC connection reconfiguration restoration request message or the message indicating failure of the random access attempt by the configuration of additional radio resources) which is distinguished from the additional radio resource connection reconfiguration complete message or additional radio resource connection re-establishment message In addition, the controller 2110 allows additional radio resources to be configured for the UE required to perform operations in accordance with embodiments of the present disclosure described above, when failing in the configuration, and the controller 2110 controls the general operation of the base station according to the resumption of the existing configuration of radio resources.

The transmission unit 2120 and the reception unit 2130 are used for transmitting and receiving signals, messages, and the data necessary for the UE to perform the above-described invention.

According to the present disclosure described above, the UE can provide a specific procedure for performing the configuration of additional radio resources through the second base station.

In addition, according to the present disclosure, when the UE fails in the configuration of additional radio resources through the second base station, it is possible to perform communication using the existing radio resources through the first base station.

In addition, even when failing in the configuration of additional radio resources through the second base station, the present disclosure has the effect of greatly reducing an unnecessary process for releasing the conventional radio resources and attempting a new connection.

Although a preferred embodiment of the present disclosure has been described for illustrative purposes, those skilled in the art will appreciate that various modifications, additions, and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A method for configuring dual connection with multiple base stations by a terminal, the method comprising:
   receiving, from a first base station, a first signal including configuration indication information that indicates the configuration of additional radio resources through a second base station, wherein the first signal includes a timer for limiting a time of the configuration of additional radio resources for the terminal;
   starting the timer included in the first signal when the first signal is received from the first base station;
   attempting random access to the second base station;
   transmitting, when the timer expires before the random access to the second base station is successfully completed, to the first base station, a second signal including failure indication information that indicates failure in the configuration of additional radio resources; and
   stopping the timer when the random access to the second base station has succeeded,
   wherein when the timer expires, the second signal includes an additional radio resource configuration failure type or a cause value.

2. The method of claim 1, wherein:
   the first signal is received through high layer signaling; and
   the configuration indication information is received through a MobilityControlInfo information element of the second base station or a MobilityControlInfo information element of a secondary cell group.

3. The method of claim 1, further comprising stopping, when the timer expires, a data radio bearer configured in the second base station or a secondary cell group.

4. The method of claim 1, wherein the second signal comprises the failure indication information indicating failure in the configuration of additional radio resources included in an RRC message for reporting failure of the configuration of additional radio resources through the second base station or radio link failure on a secondary cell group.

5. A method for controlling dual connection configuration of a UE by a first base station, the method comprising:
receiving, from a second base station, a first signal including configuration indication information that indicates configuration of additional radio resources through the second base station;
transmitting the first signal to the UE through high layer signaling, wherein the first signal transmitted to the UE includes a timer for limiting a time of the configuration of additional radio resources for the UE; and
receiving, from the UE, a second signal including failure indication information that indicates failure of the configuration of additional radio resources, wherein the second signal is received from the UE when the timer started by the UE receiving the first signal expires before a random access of the UE to the second base station is successfully completed, where the timer is stopped by the UE when the random access to the second base station has succeeded,
wherein when the timer expires, the second signal includes an additional radio resource configuration failure type or a cause value.

6. The method of claim 5, wherein the configuration indication information is transmitted through a MobilityControlInfo information element of the second base station or a MobilityControlInfo information element of a secondary cell group.

7. The method of claim 5, further comprising:
transmitting, after receiving of the second signal, to the UE, an RRC connection reconfiguration message for resuming configuration of radio resources with the UE prior to transmitting the first signal; and
resuming the configuration of radio resources with the UE prior to transmitting the first signal.

8. The method of claim 5, wherein the second signal comprises the failure indication information that indicates failure of the configuration of additional radio resources included in an RRC message for reporting failure of the configuration of additional radio resources of the second base station or radio link failure on a secondary cell group.

9. A UE for configuring dual connection with multiple base stations, the UE comprising:
a reception unit configured to receive, from a first base station, a first signal including configuration indication information that indicates configuration of additional radio resources through a second base station, wherein the first signal includes a timer for limiting a time of the configuration of additional radio resources for the UE;
a controller configured to start the timer included in the first signal when the first signal is received from the first base station and attempt a random access to the second base station and (ii) to stop the timer when the random access to the second base station has succeeded; and
a transmission unit configured to transmit, when the timer expires before the random access to the second base station is successfully completed, to the first base station, a second signal including failure indication information that indicates failure of the configuration of additional radio resources,
wherein when the timer expires, the second signal includes an additional radio resource configuration failure type or a cause value.

10. The UE of claim 9, wherein:
the first signal is received through high layer signaling; and
the configuration indication information is received through a MobilityControlInfo information element of the second base station or a MobilityControlInfo information element of a secondary cell group.

11. The UE of claim 9, wherein, when the timer expires, the controller stops a data radio bearer configured in the second base station or a secondary cell group.

12. The UE of claim 9, wherein the second signal comprises the failure indication information that indicates failure of the configuration of additional radio resources included in an RRC message for reporting failure of the configuration of additional radio resources of the second base station or radio link failure on a secondary cell group.

* * * * *

UNITED STATES PATENT AND TRADEMARK OFFICE
CERTIFICATE OF CORRECTION

PATENT NO. : 10,362,615 B2
APPLICATION NO. : 15/032651
DATED : July 23, 2019
INVENTOR(S) : Sung-pyo Hong et al.

Page 1 of 1

It is certified that error appears in the above-identified patent and that said Letters Patent is hereby corrected as shown below:

In the Claims

In Claim 9, Column 42, Line 11, please replace "a controller configured to" with --a controller configured (i) to--.

Signed and Sealed this
Eighth Day of September, 2020

Andrei Iancu
*Director of the United States Patent and Trademark Office*